(12) United States Patent
Jeon et al.

(10) Patent No.: US 10,371,577 B2
(45) Date of Patent: Aug. 6, 2019

(54) APPARATUS AND METHOD FOR MEASURING TEMPERATURE IN ELECTRONIC DEVICE

(71) Applicant: Samsung Electronics Co., LTD., Gyeonggi-do (KR)

(72) Inventors: Tae-Han Jeon, Gyeonggi-do (KR); Hongsig Kim, Gyeonggi-do (KR); Hyungrock Jung, Seoul (KR); Kyungseok Kim, Gyeonggi-do (KR); Jungkeun Park, Seoul (KR); Taegun Park, Gyeonggi-do (KR); Cheolho Cheong, Seoul (KR)

(73) Assignee: Samsung Electronics Co., Ltd., Yeong-gu, Suwon-si, Gyeonggi-do (KR)

( * ) Notice: Subject to any disclaimer, the term of this patent is extended or adjusted under 35 U.S.C. 154(b) by 415 days.

(21) Appl. No.: 15/092,057

(22) Filed: Apr. 6, 2016

(65) Prior Publication Data
US 2016/0299009 A1    Oct. 13, 2016

(30) Foreign Application Priority Data
Apr. 13, 2015    (KR) .......................... 10-2015-0051955

(51) Int. Cl.
*G01J 5/00* (2006.01)
*G01J 5/02* (2006.01)
*G01J 5/08* (2006.01)

(52) U.S. Cl.
CPC ........... *G01J 5/0896* (2013.01); *G01J 5/0025* (2013.01); *G01J 5/025* (2013.01); *G01J 5/026* (2013.01); *G01J 5/0265* (2013.01); *G01J 5/0275* (2013.01); *G01J 5/089* (2013.01); *G01J 5/0846* (2013.01)

(58) Field of Classification Search
CPC ...... G01J 5/0025; G01J 5/0896; G01J 5/0846; G01J 5/025; G01J 5/0275; G01J 5/0265; G01J 5/026; G01J 5/089
See application file for complete search history.

(56) References Cited

U.S. PATENT DOCUMENTS

| 5,388,907 | A | * | 2/1995 | Aoyama | .................. G01J 5/02 250/201.2 |
| 5,696,703 | A | * | 12/1997 | Barber | .................... G01J 5/602 374/121 |
| 7,810,992 | B2 | | 10/2010 | Chen et al. | |
| 2004/0005086 | A1 | * | 1/2004 | Wolff | ................. G06K 9/00228 382/118 |
| 2006/0189863 | A1 | * | 8/2006 | Peyser | ................. A61B 5/0031 600/345 |

(Continued)

FOREIGN PATENT DOCUMENTS

KR    10-2007-0057321 A    6/2007
KR    10-2011-0070321 A    6/2011

*Primary Examiner* — Justin Seo
*Assistant Examiner* — John M Royston
(74) *Attorney, Agent, or Firm* — Cha & Reiter, LLC

(57) ABSTRACT

An apparatus and method for measuring a temperature in an electronic device. An amount of light of an optical signal reflected off of an object is measured, and a size of a temperature measurement expectation area on the object based is determined based on the measured amount of light. A temperature measurement guide message is output based on a result of comparing the determined size and a reference area.

20 Claims, 14 Drawing Sheets

(56) References Cited

U.S. PATENT DOCUMENTS

| | | | | |
|---|---|---|---|---|
| 2010/0328090 A1* | 12/2010 | Hiramatsu | ............ | G01K 1/146 340/687 |
| 2012/0114013 A1* | 5/2012 | Tsuchida | ............. | G01K 13/002 374/185 |
| 2014/0140368 A1* | 5/2014 | Yildizyan | ............. | G01J 5/0275 374/121 |

* cited by examiner

US 10,371,577 B2

APPARATUS AND METHOD FOR MEASURING TEMPERATURE IN ELECTRONIC DEVICE

CLAIM OF PRIORITY

The present application claims the benefit of priority under 35 U.S.C. § 119 from an application filed in the Korean Intellectual Property Office on Apr. 13, 2015 and assigned Serial No. 10-2015-0051955, the contents of which are incorporated herein by reference.

TECHNICAL FIELD

Various embodiments of the present disclosure relate to an apparatus and method for measuring a temperature in an electronic device.

BACKGROUND

Due to the recent developments in electronic communication industry, electronic devices (for example, smart phones, tablet computers, etc.) have become essential items and provide an important way for transferring rapidly changing information in modern society. Such electronic devices have been developed to provide a function of measuring users' physiological conditions and providing relevant information, in addition to the simple functions of communicating or providing entertainment.

The electronic device may provide various functions of checking a user's physical condition, for example, by providing a function of measuring a blood pressure, a temperature, a blood glucose, or a pulse rate.

The electronic device, which provides a non-contact temperature measuring function, may utilize a method for tracking a change in the location of the electronic device and guiding the electronic device to approach an appropriate location for measuring a temperature of a an examinee in order to obtain an accurate temperature measurement.

In addition, when the electronic device determines whether the electronic is located on an appropriate location from the measurement part using a photo sensor embedded therein, light absorptance varies according to a color of the measurement part. Therefore, it is difficult to find an appropriate location based on an amount of light received at the photo sensor, and thus there is a need for a method for solving this problem.

SUMMARY

An aspect of the present disclosure provides an apparatus and method in an electronic device for measuring a temperature, which can be used as a guide to move (i.e. locate) the electronic device to an appropriate location to measure a temperature of an examinee in order to obtain an accurate measure of the temperature.

Another aspect of the present disclosure provides an apparatus and method for accurately measuring a location of an electronic device with reference to a temperature measurement examined.

Another aspect of the present disclosure provides an apparatus and method for measuring an exact location of an electronic device with reference to a measurement part of a temperature measurement examinee regardless of skin color of the examinee whose temperature is being measured.

According to an aspect of the present disclosure, a method for measuring a temperature in an electronic device includes: measuring an amount of light of an optical signal that has reflected off of an object; determining a size of a temperature measurement expectation area on the object based on the measured amount of light; and outputting a temperature measurement guide message based on a result of comparing the determined size to a value of a reference area.

According to another aspect of the present disclosure, an apparatus for measuring a temperature in an electronic device includes: a photo sensor; a temperature sensor; and a processor configured to receive by the photo sensor an optical signal reflected off of an object to measure an amount of light of the optical signal, determine a size of a temperature measurement expectation area on the object based on the measured amount of light, and output a temperature measurement guide message based on a result of comparing the determined size to a value of a reference area.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
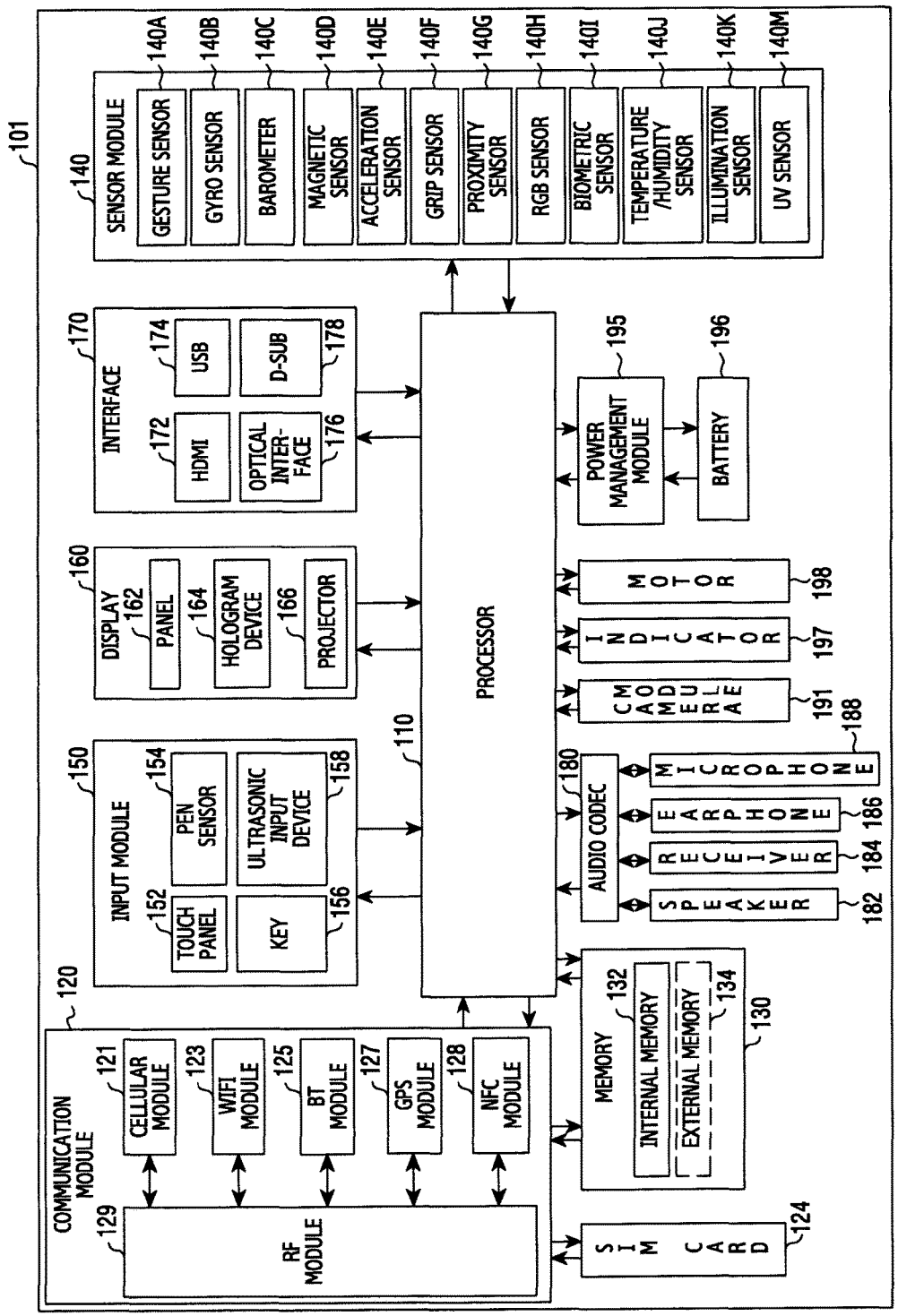
FIG. 1 illustrates a block diagram showing an electronic device according to an embodiment of the present disclosure.

The following description with reference to the accompanying drawings is provided to assist a person of ordinary skill in the art with a comprehensive understanding of various embodiments of the present disclosure as defined by the claims and their equivalents. The description includes various specific details to assist the person of ordinary skill in the art in that understanding but these details are to be regarded as merely being provided for illustrative purposes. Accordingly, a person of ordinary skill in the art will recognize that various changes and modifications of the various embodiments described herein can be made without departing from the present of the disclosure. In addition, descriptions of well-known functions and implementations may be omitted for clarity and conciseness when their inclusion would obscure an artisan's appreciation of the various novel and non-obvious features with the description of well-known functions and implementations.

The terms and words used in the following description and claims are not limited to the bibliographical meanings, but, are provided to enable a person of ordinary skill in the art with a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "include" or "may include", etc. that may be used in the disclosure indicate existence of a disclosed relevant function, operation, or element, etc., and do not limit additional one or more functions, operations, or elements, etc. Also, it should be understood that terminologies such as "include" or "have", etc. in the disclosure are intended for designating existence of a characteristic, a number, an operation, an element, a part, or a combination of these described on the specification and do not exclude in advance existence or addition possibility of one or more other characteristics, numbers, operations, elements, parts, or a combination of these.

Expression such as "or", etc. in the disclosure includes a certain and all combinations of words listed together. For example, "A or B" may include A and may include B, or include both A and B.

In the disclosure, expressions such as "1st", "2nd", "first" or "second", etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in the disclosure is used for explaining only a specific example and is not intended to limit the disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the disclosure belongs. It should be understood that generally used terminologies defined by a dictionary have meaning coinciding with meaning on context of a related technology, and unless clearly defined in the disclosure, they are not understood as an ideal or excessively formal meaning.

An electronic device as described in this disclosure may be a device including a communication function. For example, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., a head-mounted-device (HMD) such as electronic glasses, an electronic clothing, an electronic bracelet, an electronic necklace, an electronic "appcessory", an electronic tattoo, or a smartwatch).

According to certain aspects of the disclosure, an electronic device may be embodied as a smart home appliance having a communication function. A smart home appliance may include, for example, at least one of a television, a digital video disc (DVD) player, an audio, a refrigerator, an air conditioner, a cleaner, an oven, an electronic range, a washing machine, an air purifier, a set-top box, a television (TV) box (e.g., Samsung HomeSync™, Apple TV™, or Google TV™), game consoles, an electronic dictionary, an electronic key, a camcorder, or an electronic frame.

According to certain aspects of the disclosure, an electronic device may include at least one of various medical devices (e.g., magnetic resonance angiography (MRA), magnetic resonance imaging (MRI), computed tomography (CT), a shooting device, an ultrasonic device, etc.), a navigation device, a global positioning system (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain examples, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the disclosure may be a combination of one or more of the above-described devices. Also, it will be apparent to one skilled in the art that the electronic device examples of the disclosure are not limited to the above-described devices.

An electronic device according to various examples of the present disclosure is described with reference to the accompanying drawings. A terminology of a user used in various examples may indicate a person who uses an electronic device or a device (e.g., an artificial intelligence electronic device) that uses the electronic device.

FIG. 1 illustrates a block diagram of an electronic device 11 according to various embodiments of the present disclosure.

Referring now to FIG. 1, the electronic device 101 may include an application processor (AP) 110, a communication module 120, a subscriber identification module (SIM) card 124, a memory 130, a sensor module 140, an input device 150, a display 160, an interface 170, an audio module 180, a camera module 191, a power management module 195, a battery 196, an indicator 197, or a motor 198.

The processor 110, which includes hardware circuitry configured for operation, may execute an operating system or an application program to control a plurality of hardware or software constituent elements connected to the processor 110, and may perform processing and operations of various data including multimedia data. The processor 110 may be, for example, implemented as a system on chip (SoC). According to an embodiment of the present disclosure, the processor 110 may further include a graphical processing unit (GPU) (not shown). There may be a plurality of processors with operations distributed thereto. Moreover, the processor 110 may further include at least one other constitute elements (ex: the cellular module 221) shown in FIG. 1. The processor 110 may load an instruction(s) or data, which is received from a non-volatile memory connected to each or at least one of other constituent elements, to a volatile memory and process the loaded instruction(s) or data. In addition, the processor 110 may store data in the non-volatile memory, which is received from at least one of the other constituent elements or is generated by at least one of the other constituent elements.

For example, the communication module 120, which may include hardware such as a transmitter, receiver, transceiver, and is connected to or includes one or more antennas, may transmit to an external device a temperature measurement guide message for measuring an exact temperature of an object. The external device that receives the temperature measurement guide message may include, for example, a wearable device that receives the message through short-distance communication. Such a short-distance communication may include, for example, Near-Field Communication (NFC) but is not limited to this protocol, and may include, for example, Bluetooth©, Bluetooth Low Energy© (BLE) Hereinafter, the object may be a thing or a living thing having a specific shape. In addition, the temperature measurement guide message is a message including a temperature measurement guide or a temperature measurement result, and may be outputted in the form of at least one of light emission (for example, a change in one or more of an intensity of light emission, a frequency of light emission, and light emission color), a voice, a vibration, letters, and an image.

In another example, the communication module 120 may transmit temperature measurement data pre-stored in the memory 130 to an external device or a server. Herein, the "temperature measurement data" may be data which is stored by accumulating the results of temperature measurement, and the external device or the server may be an external device or a server which is designated by a temperature measurement examinee. For example, the external device may be an electronic device operated by a doctor, nurse, or healthcare practitioner of the examinee undergoing a temperature measurement, and the server may be a server of a hospital where the doctor of the temperature measurement examinee is working. The aforementioned examples are provided for illustrative purposes only and do not limit the claims or their equivalents to such an environment for operation.

The cellular module 121 may provide a voice telephony, a video telephony, a text service, an Internet service, and the like, through a telecommunication network (e.g., LTE, LTE-A, CDMA, WCDMA, UMTS, WiBro, GSM, and the like). In addition, the cellular module 121 may, for example, use a SIM (e.g., the SIM card 124) to perform electronic device distinction and authorization within the telecommunication network. According to an embodiment of the present disclosure, the cellular module 121 may perform at least some of functions that the AP 110 may provide. For example, the cellular module 121 may perform at least one part of a multimedia control function.

The WiFi module 123, the BT module 125, the GPS module 127 or the NFC module 128 each may include, for example, a processor having circuitry configured for processing data transmitted/received through the corresponding module. According to an embodiment of the present disclosure, at least some (e.g., two or more) of the cellular module 121, the WiFi module 123, the BT module 125, the GPS module 127 or the NFC module 128 may be included within one integrated circuit (IC) or IC package.

The RF module 129 may perform transmission/reception of data, for example, transmission/reception of an RF signal. Though not illustrated, the RF module 129 may include, for example, a transceiver, a Power Amplifier Module (PAM), a frequency filter, a Low Noise Amplifier (LNA), an antenna and the like. According to an embodiment of the present disclosure, at least one of the cellular module 121, the WiFi module 123, the BT module 125, the GPS module 127 or the NFC module 128 may perform transmission/reception of an RF signal through a separate RF module.

The SIM card 124 may be inserted into a slot provided in a specific position of the electronic device 101. The SIM card 124 may include unique identification information (e.g., an integrated circuit card ID (ICCID)) or subscriber information (e.g., an international mobile subscriber identity (IMSI)).

The memory 130, which is a non-transitory memory, may include an internal memory 132 or an external memory 134. The internal memory 132 may include, for example, at least one of a volatile memory (e.g., a dynamic random access memory (DRAM), a static RAM (SRAM) and a synchronous DRAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 132 may be a solid state drive (SSD). The external memory 134 may further include a flash drive, for example, compact flash (CF), secure digital (SD), micro-SD, mini-SD, extreme digital (xD), a memory stick, and the like. The external memory 134 may be operatively connected with the electronic device 101 through various interfaces.

In addition, the memory 130 may pre-store reference values for measuring an exact temperature of an object. For example, the memory 130 may store at least one of a reference area and a reference light amount sensitivity. Herein, the reference area indicates a most suitable area to measure the temperature of the object in the temperature/humidity sensor 140J, and may be pre-set based on data which is accumulated through experiments to test temperature sensing performance of the temperature/humidity sensor 140J and to measure the temperature. In addition, the reference light amount sensitivity indicates a light amount sensitivity corresponding to a most suitable measurement location to measure the temperature of the object, and may be pre-set based on data which is accumulated through experiments to test light sensing performance of a photo sensor (not shown) included in the sensor module 140, and to measure the temperature.

Figure 9:
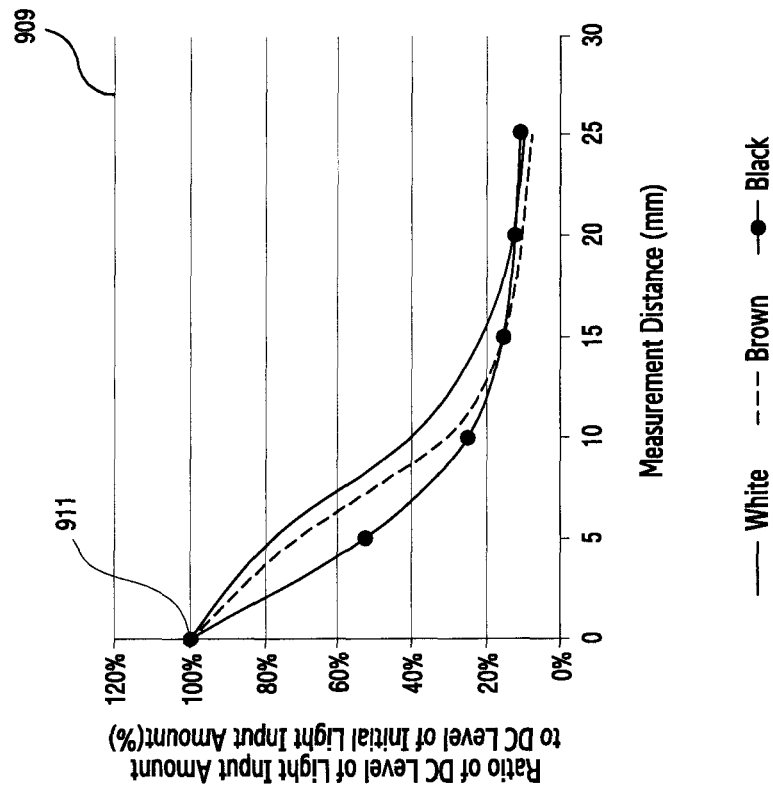
FIG. 9 illustrates graphs showing a change in a direct current level intensity according to a distance from a photo sensor according to an embodiment of the present disclosure.
Figure 9:
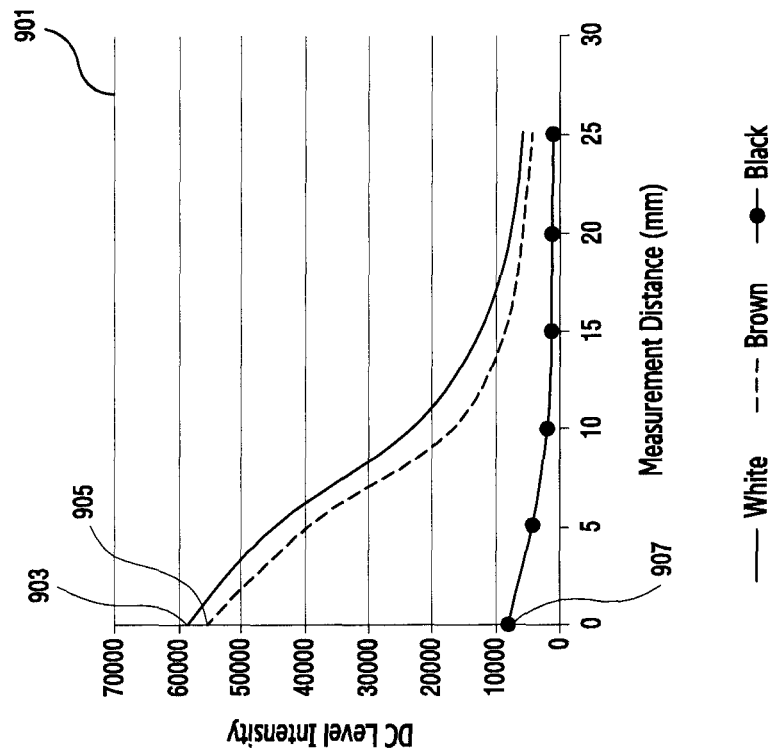

For example, the memory 130 may store the values of respective sizes of temperature measurement expectation areas in comparison to measurement distances in the form of a table or a graph. In another example, the memory 130 may store the values of respective light amount sensitivities in comparison to measurement distances in the form of a table, or may store in the form of a graph 909 as shown in FIG. 9. In another example, when the object is a human body, the memory 130 may store at least one of an image of a specific body part or information on distribution of colors of a body part, in order for the processor 110 to determine whether a temperature measurement area of the temperature/humidity sensor 140J is a most suitable body part to measure a temperature or not using an image inputted from the camera module 191.

The sensor module 140 may measure a physical quantity or detect an activation state of the electronic device 101, and convert measured or detected information into an electric signal. The sensor module 140 may include, for example, at least one of a gesture sensor 140A, a gyro sensor 140B, an air pressure sensor 140C, a magnetic sensor 140D, an acceleration sensor 140E, a grip sensor 140F, a proximity sensor 140G, a color sensor 140H (e.g., a red, green, blue (RGB) sensor), a bio-physical sensor 140I, a temperature/humidity sensor 140J, an illumination sensor 140K, a ultraviolet (UV) sensor 140M, and the like, just to name some non-limiting possibilities. Additionally or alternatively, the sensor module 140 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), and the like. The sensor module 140 may further include a control circuit for controlling at least one or more sensors belonging therein.

For example, the temperature/humidity sensor 140J may measure a temperature of an object using infrared ray energy emitted from the object. For example, the photo sensor (not shown) may be a PhotoPlethysmGraphy (hereinafter, referred to as "PPG") sensor. Herein, the PPG sensor is a sensor which measures an amount of blood flow, a change in the amount of blood flow, or oxygen saturation (SPO2) by emitting light of a specific wavelength (for example, at least one of infrared ray, blue light, red light, or white light) to skin, and measuring an amount of light reflected off of or passing through the skin. In another example, the photo sensor (not shown) may be the proximity sensor 140G to evaluate proximity.

For example, the photo sensor (not shown) and the temperature/humidity sensor 140J may be located on the rear surface of the electronic device 101, but this should not be considered as limiting. For example, the photo sensor (not shown) and the temperature/humidity sensor 140J may be located on the front surface or side surface of the electronic device 101.

The input device 150 may include a touch panel 152, a (digital) pen sensor 154, a key 156, an ultrasonic input device 158, and the like. The touch panel 152 may, for example, detect a touch input in at least one of a capacitive overlay scheme, a pressure sensitive scheme, an infrared beam scheme, or an acoustic wave scheme. In addition, the touch panel 152 may further include a control circuit as well. In a case of the capacitive overlay scheme, physical contact or proximity detection is possible. The touch panel 152 may further include a tactile layer as well. In this case, the touch panel 152 may provide a tactile response to a user. For example, the input device 150 may receive a temperature measurement command from the user and forward the temperature measurement command to the processor 110.

The (digital) pen sensor 154 may be implemented in the same or similar method to receiving a user's touch input or by using a separate sheet for detection. The key 156 may include, for example, a physical button, an optical key, or a keypad. The ultrasonic input device 158 is a device capable of identifying data by detecting a sound wave in the electronic device 101 through an input tool generating an ultrasonic signal, and enables wireless detection. According to an embodiment of the present disclosure, the electronic device 101 may also use the communication module 120 to receive a user input from an external device (e.g., a computer or a server) connected with this.

The display 160 (e.g., the display 160) may include a panel 162, a hologram device 164, or a projector 266. The panel 162 may be, for example, an LCD, an Active-Matrix Organic LED (AMOLED), and the like. The panel 162 may be, for example, implemented to be flexible, transparent, or wearable. The panel 162 may be implemented as one module along with the touch panel 152 as well. The hologram device 164 may use interference of light to show a three-dimensional image in the air. The projector 166 may project light to a screen to display an image. The screen may be, for example, located inside or outside the electronic device 101. According to an embodiment of the present disclosure, the display 160 may further include a control circuit for controlling the panel 162, the hologram device 164, or the projector 166.

The interface 170 may include, for example, an HDMI 172, a USB 174, an optical interface 176, or a D-subminiature (D-sub) 178. Additionally or alternatively, the interface 170 may include, for example, a mobile high-definition link (MHL) interface, a SD card/multimedia card (MMC) interface or an infrared data association (IrDA) standard interface.

The audio module 180 may convert a voice and an electric signal interactively. The audio module 180 may, for example, process sound information which is inputted or outputted through a speaker 182, a receiver 184, an earphone 186, the microphone 188, and the like.

The camera module 191 is a device able to take a still picture and a moving picture. According to an embodiment of the present disclosure, the camera module 191 may include one or more image sensors (e.g., a front sensor or a rear sensor) such as CCD or CMOS, a lens (not shown), an image signal processor (ISP) (not shown), or a flash (not shown) (e.g., an LED or a xenon lamp). For example, the camera module 191 may generate an image while a temperature is being measured, and output the image to the processor 110.

The power management module 195 may manage electric power of the electronic device 101. Though not illustrated, the power management module 195 may include, for example, a power management integrated circuit (PMIC), a charger IC, a battery, a fuel gauge, and the like.

The PMIC may be, for example, mounted within an integrated circuit or an SoC semiconductor. A charging scheme may be divided into a wired charging scheme and a wireless charging scheme. The charger IC may charge the battery 296, and may prevent the inflow of overvoltage or overcurrent from an electric charger. According to an embodiment of the present disclosure, the charger IC may include a charger IC for at least one of the wired charging scheme or the wireless charging scheme. The wireless charging scheme may, for example, be a magnetic resonance scheme, a magnetic induction scheme, an electromagnetic wave scheme, and the like. A supplementary circuit for wireless charging, for example, a circuit, such as a coil loop, a resonance circuit, a rectifier, and the like, may be added.

The battery gauge may, for example, measure a level of the battery 196, a voltage during charging, a current or a temperature. The battery 196 may generate or store electricity, and use the stored or generated electricity to supply power to the electronic device 101. The battery 196 may include, for example, a rechargeable battery or a solar battery.

The indicator 197 may display a specific status of the electronic device 101 or one part (e.g., the processor 110) thereof, for example a booting state, a message state, a charging state, and the like. The motor 198 may convert an electric signal into a mechanical vibration. Though not illustrated, the electronic device 101 may include a processing device (e.g., a GPU) for mobile TV support. The processing device for mobile TV support may, for example, process media data according to the standards of digital multimedia broadcasting (DMB), digital video broadcasting (DVB), a media flow, and the like.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

Figure 2:
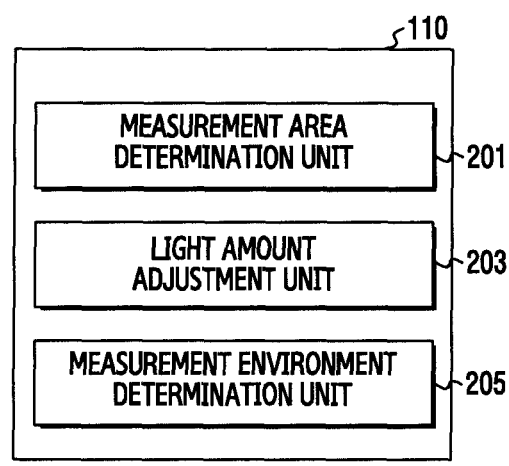
FIG. 2 illustrates a block diagram showing a processor according to an embodiment of the present disclosure.

FIG. 2 illustrates a block diagram of at least one processor 110 according to an embodiment of the present disclosure. From now on, the processor 110 will be explained with reference to FIGS. 1 and 2.

The at least one processor 110 may include a measurement area determination unit 201, a light amount adjustment unit 203, and a measurement environment determination unit 205 as shown in FIG. 2.

Explaining each element, the measurement area determination unit 210 may calculate a surface area of an object to measure radiant energy emitted from the object from among the entire surface of the object in order for the temperature/humidity sensor 140J to measure a temperature. The light amount adjustment unit 203 may determine a light output amount value of an optical signal in the photo sensor (not shown) in order to measure a measurement distance between the electronic device and the object or a surface area of the measurable object according to color of the object. In addition, the measurement environment determination unit 205 may identify a factor which hinders temperature measurement when the temperature/humidity sensor 140J measures a temperature using an image inputted from the camera module 191.

According to an embodiment, when a temperature measurement is requested by the user, the processor 110 may output an optical signal external to the electronic device through the photo sensor (not shown), and measure an amount of received light of the optical signal. In addition, the processor 110 may determine a size of a temperature measurement expectation area on the temperature/humidity sensor 140J, or a light amount sensitivity of the outputted optical signal based on the measured amount of received light.

Herein, the temperature measurement expectation area refers to a surface area of the object from which the temperature/humidity sensor 140J detects radiant energy. According to an embodiment, the amount of light sensitivity of the optical signal refers to a ratio between an amount of light output of the optical signal and an amount of light input (hereinafter, referred to as a light reception ratio), and the amount of light output refers to an amount of light output to the object (incident on the object) from a light emission unit (not shown) of the photo sensor (not shown), and the amount of light input refers to an amount of light reflected off of the object and entering a light reception unit (not shown) of the photo sensor (not shown).

According to an embodiment, the amount of light sensitivity may be an amount of received light of the optical signal in comparison to a measurement distance. According to another embodiment, the light amount sensitivity refers to a ratio of a direct current level of the amount of light input to a direct current level of the amount of light output received by the photo sensor (not shown), which is measured according to a distance.

According to another embodiment, the amount of light sensitivity may be a relative ratio between a maximum light reception ratio obtained through the electronic device 101 and a light reception ratio obtained according to a change in the location of the electronic device 101. For example, when the photo sensor (not shown) of the electronic device 101 is in contact with the surface (for example, skin) of the object, the electronic device 101 may obtain the maximum light reception ratio, and, as a distance between the electronic device 101 and the object increases, the light reception ratio becomes lower. Considering the aforementioned feature, the light amount sensitivity may be determined based on a ratio of a light reception ratio from each respective distance to a distance where the maximum light reception ratio is reached.

According to another embodiment, the amount of light sensitivity may include information related to the amount of received light or the light reception ratio obtained through the photo sensor (not shown) regarding the size of the temperature measurement expectation area of the object measured through the temperature/humidity sensor 140J.

According to another embodiment, the amount of light sensitivity may be a ratio between an initial amount of light input and an amount of light input which is obtained according to a change in the location of the electronic device. Herein, the initial amount of light input refers to an amount of light entering the light reception unit (not shown)

of the photo sensor (not shown) when the electronic device is in contact with the surface of the object (for example, skin).

In addition, the processor 110 may determine whether the electronic device is at a suitable distance (a threshold distance or threshold range) from the object to measure a temperature, or is located at a location suitable (amenable) to measure a surface area of the object (for example, considering a distance between the object and the electronic device 101 and an angle of the photo sensor (not shown) for receiving light), based on the result of comparing the determined size of the temperature measurement expectation area or light amount sensitivity, and the reference area or the reference light amount sensitivity which is pre-stored in the memory 130. In addition, the at least one processor 110 may generate a temperature measurement guide message according to the result, and output the message, for example, via a display and/or audio, or transmit the message to an external device.

According to a first embodiment, the measurement area determination unit 201 may calculate the size of the temperature measurement expectation area on the temperature/humidity sensor 140J based on the measured amount of received light. Herein, the temperature measurement expectation area refers to a surface area of the object from which the temperature/humidity sensor 140J measures radiant energy. According to an embodiment, the amount of received light has a correlation (for example, an inverse relationship or an exponential function) with at least one of a distance between the photo sensor (not shown) and the object and a light reception angle of the light reception unit included in the photo sensor (not shown). The processor 110 may determine the distance between the photo sensor (not shown) and the object using this property of light, and determine the size of the temperature measurement expectation area of the temperature/humidity sensor 140J using the determined distance.

For example, the measurement area determination unit 201 may determine a distance between the photo sensor (not shown) and the object, which corresponds to the measured amount of light. In addition, the measurement area determination unit 201 may determine a distance between the temperature/humidity sensor 140J and the object based on the determined measurement distance and a distance between the photo sensor (not shown) and the temperature/humidity sensor 140J. In addition, the measurement area determination unit 201 may determine the size of the temperature measurement expectation area of the temperature/humidity sensor 140J based on at least one of the distance between the temperature/humidity sensor 140J and the object, or the light reception angle of the temperature/humidity sensor 140J.

According to a second embodiment, the light amount adjustment unit 203 may determine an amount of light output based on a value indicated by the photo sensor (not shown) so that the amount of light sensitivity of the optical signal outputted from the photo sensor (not shown) reaches a pre-set specific value.

For example, the light amount adjustment unit 203 may set a specific value related to a first amount of light input of a first optical signal (for example, a size or intensity of a signal received through the light reception unit (not shown) of the photo sensor (not shown)), and, when a specific condition (for example, at least one of the case where a driving command of the temperature/humidity sensor 140J is inputted, or the case where contact of the electronic device with a living body is detected) is satisfied, the light amount adjustment unit 203 may adjust a size or an intensity of a signal related to a first amount of light output as the first optical signal (for example, a voltage or a current of a signal related to the amount of the first light output, or a voltage level or a current level related to illuminance or light emission of the photo sensor (not shown) (for example, the light emission unit (not shown)).

In addition, the light amount adjustment unit 203 may measure the first amount of light input of the first optical signal according to the adjustment, adjust the size or intensity of the signal related to the first amount of light output of the first optical signal until the measured value reaches a specific value or a similar value (with a predetermined range of a specific value, and, when the measurement value of the first light input amount reaches the specific value or the similar value (with the predetermined range), determine the size or intensity of the corresponding signal as a light output amount value of a second optical signal. Herein, the similar value refers to a value which is included in a pre-set range with reference to the specific value. In another example, the light amount adjustment unit 203 may calculate a difference between a direct current level corresponding to the amount of first light input of the first optical signal and a direct current level corresponding to the amount of first light output of the first optical signal. In addition, the light amount adjustment unit 203 may compare the calculated difference to a reference value. Herein, the reference value refers to a difference between the direct current level corresponding to the first amount of light output when the amount of light sensitivity of the first optical signal reaches the specific value, and the direct current level corresponding to the amount of first light input, and may be pre-stored in the memory 130. For example, when the specific value is 100%, the reference value may be "0."

When the calculated difference is equal to the reference value as a result of the comparison, the light amount adjustment unit 203 may determine that the amount of light sensitivity of the first optical signal reaches the specific value, and determine a value of the current amount of light output of the first optical signal as the value of amount of light output of the second optical signal. Herein, the second optical signal refers to an optical signal resulting from the adjustment of the amount of light output of the first optical signal to adjust the light amount sensitivity of the first optical signal to the specific value. When the calculated difference is not equal to the reference value, the light amount adjustment unit 203 may determine the value of the amount of light output of the second optical signal based on the calculated difference.

According to a third embodiment, the measurement environment determination unit 205 may determine whether or not an ambient environment is suitable to measure a temperature.

For example, the measurement environment determination unit 205 may extract a temperature measurement area from an image outputted from the camera module 191. In addition, the measurement environment determination unit 205 may determine whether or not there are impurities in the temperature measurement area using an image of the extracted temperature measurement area. For example, the measurement environment determination unit 205 may analyze the image of the extracted temperature measurement area, and determine whether there are eyebrows, hair or an object hindering temperature measurement in the image of the temperature measurement area.

When impurities exist in in the image of the temperature measurement area as a result of the determination, the measurement environment determination unit 205 may determine that the temperature measurement environment is not suitable to measure a temperature. When there are no impurities in the image of the temperature measurement area, the measurement environment determination unit 205 may determine whether there exists a specific body part in the temperature measurement area or not. In this case, the measurement environment determination unit 205 may determine whether there exists a specific body part in the temperature measurement area by comparing the image of the extracted temperature measurement area and a pre-stored specific body part, or using other methods of identifying a specific body part. Herein, the specific body part refers to a body part from which a temperature can be measured accurately, and for example, may be a part in which temporal coronary arteries are located or a philtrum.

As a result, when there exists a specific body part in the temperature measurement area, the measurement environment determination unit 205 may determine that the temperature measurement environment is suitable to measure a temperature. When there are no specific body parts in the temperature measurement area, the measurement environment determination unit 205 may determine that the temperature measurement environment is not suitable to measure a temperature.

According to another embodiment, the measurement environment determination unit 205 may determine whether the temperature measurement area is suitable to measure a temperature using information related to the optical signal received from the photo sensor (not shown). For example, the measurement environment determination unit 205 may determine whether there exist objects other than skin for example, eyebrows, hair, or an object hindering temperature measurement) in the temperature measurement area based on the amount of received light or the light reception ratio.

The at least one processor 110 may control the motor 198 to have a haptic effect when outputting the temperature measurement guide message as a vibration. For example, referring now to FIG. 14, when a current location of the electronic device is a location in which the measured size of the temperature measurement expectation area exceeds or is less than a reference area or a reference area range (for example, 85 to 115% of the reference area) corresponding to a reference distance 1407 or a measurement reference location, the processor 110 may output a temperature measurement guide message meaning that the electronic device does not reach the reference distance or the measurement reference location using a vibration generated through the motor 198. Herein, the measurement reference location is a location which is pre-set considering the reference distance and a light reception angle of the temperature/humidity sensor 140J. In addition, when the size of the temperature measurement expectation area is equal to the reference area, the processor 110 may output a temperature measurement guide message meaning that the electronic device reaches the reference distance or the measurement reference location by stopping the vibration of the motor 198.

In addition, the processor 110 may guide a moving direction of the electronic device by adjusting a vibration intensity considering a change in the size of the temperature measurement area of the electronic device with reference to the reference area. For example, the processor 110 may gradually reduce or increase the vibration intensity as a difference between the size of the temperature measurement expectation area and the reference area gets closer to 0. In addition, the aforementioned processor 110 may gradually increase or reduce the vibration intensity as the difference between the size of the temperature measurement expectation area and the reference area gets further away from 0.

In another example, the processor 110 may inform the user that the electronic device is located on the measurement reference location by determining whether or not to vibrate by considering a change in the size of the temperature measurement area of the electronic device with reference to the reference area. In other words, when the electronic device is located on the measurement reference location, the at least one processor 110 may generate a vibration. Alternatively, when the electronic device is not located on the measurement reference location, the at least one processor 110 may generate a vibration.

In addition, the at least one processor 110 may control the audio module 180 to output a temperature measurement guide message as a sound. For example, when the size of the temperature measurement area measured in the current location of the electronic device exceeds or is less than the reference area or the reference area range (for example, 85 to 115% of the reference area) corresponding to the pre-set reference distance or the measurement reference location, the processor 110 may output a temperature measurement guide message meaning that the electronic device does not reach the reference distance or the measurement reference location through the audio module 180. In addition, when the size of the temperature measurement area measured in the current location of the electronic device is equal to the reference area, the processor 110 may output a temperature measurement guide message meaning that the electronic device reaches the reference distance 1407 or the measurement reference location through the audio module 180.

In another example, the processor 110 may provide a voice guide to instruct the user to move the electronic device to a different location to measure a temperature through the audio module 180.

According to various embodiments, the processor 110 may output the temperature measurement guide message using light emission (for example, a change in one or more of an intensity of light emission, a frequency of light emission, and a color of the light emission). For example, the processor 110 may change the frequency of light emission or the light emission color according to whether the size of the temperature measurement area falls within the reference area range. In another example, the processor 110 may change the frequency of the light emission or the color of the light emission color according to a difference between the size of the temperature measurement area and the reference area range.

In addition, the processor 110 may guide a moving direction of a user of the electronic device by adjusting the speed of a sound beat considering a change in the size of the temperature measurement area of the electronic device with reference to the reference area. For example, the processor 110 may gradually speed up or slow down the sound beat through the audio module 180 as the size of the temperature measurement area of the electronic device gets closer to the reference area corresponding to the reference distance. In another example, the processor 110 may gradually speed up or slow down the sound beat through the audio module 180 as the size of the temperature measurement area of the electronic device gets further away from the reference area. In either case, the user is being provided with feedback based on movement of the electronic device.

According to various embodiments, the at least processor 110 may extract the temperature measurement area from the image outputted from the camera module 191, or may determine whether or not the size of the temperature measurement area of the electronic device falls within the reference area range using the image of the extracted temperature measurement area. For example, the at least one processor 110 may determine a direction in which hair or eyebrows exist, or a direction in which skin exists by analyzing the image of the extracted temperature measurement area. In another example, the processor 110 may determine whether a distance between the electronic device and the object is a distance corresponding to an area/range of a suitable temperature measurement area by analyzing the image of the extracted temperature measurement area, and determining the location and size of an object (for example, at least one of eyes, eyebrows, nose, hair, etc.) included in the corresponding image.

The at least one processor 110 may guide the user to move the electronic device in a suitable direction using at least one sound device or at least one haptic device. For example, the at least one processor 110 may guide on the suitable direction using a stereo sound or a voice through speakers placed on the left and right of the electronic device. In another example, when the electronic device is provided with a plurality of haptic devices, the at least one processor 110 may control dynamics or a tempo of each haptic device differently to guide a user of the electronic device about a moving direction, a moving distance, etc. of the electronic device.

In the above-described example, the at least one processor 110 adjusts at least one of the vibration intensity and the sound beat based on the size of the temperature measurement area of the electronic device. However, the aforementioned adjustment should not be considered as limiting. For example, the at least one processor 110 may adjust at least one of the vibration intensity and the sound beat based on the light amount sensitivity of the electronic device.

Figure 10:
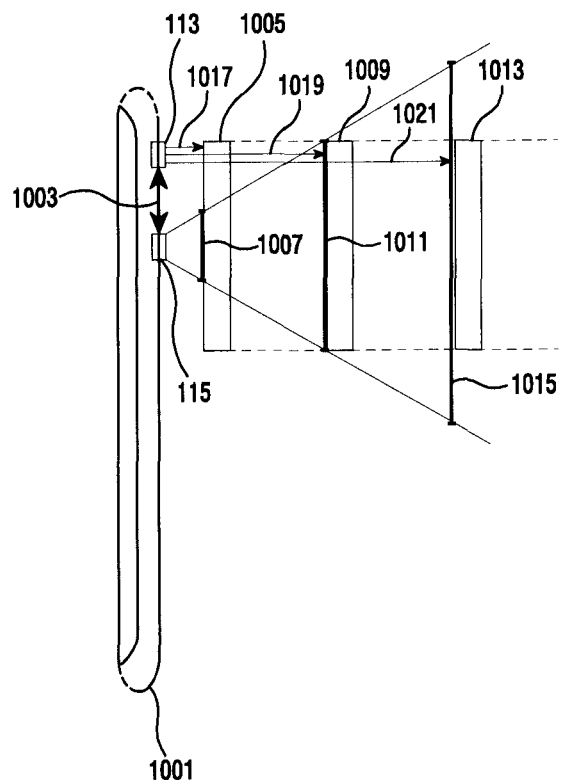
FIG. 10 illustrates a view showing a change in a temperature measurement area according to a distance between an electronic device and an object according to an embodiment of the present disclosure.
Figure 11:
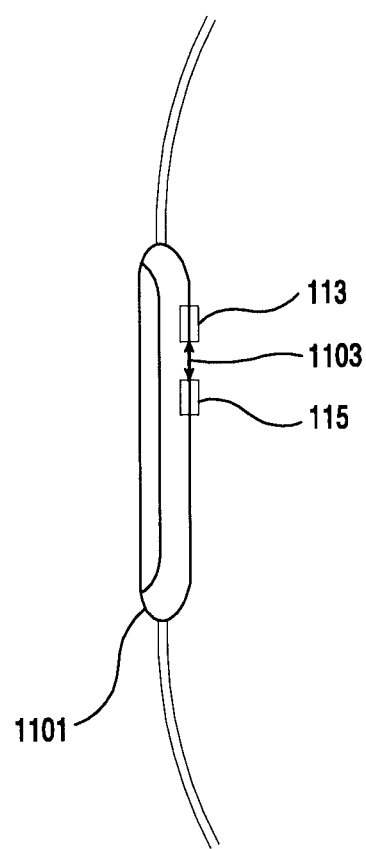
FIG. 11 illustrates a side view of a wearable device according to an embodiment of the present disclosure.

According to an embodiment, it is assumed that the electronic device may be a portable terminal 1001 as shown in FIG. 10, and the photo sensor (not shown) and the temperature/humidity sensor 140J are separated from each other by a predetermined distance 1003 on the rear surface of the portable terminal 1001. However, this assumption is illustrative, and the present disclosure is not limited to this. For example, as shown in FIG. 11, the electronic device may be a wearable device (for example, a wearable watch) 1101 provided with the photo sensor (not shown) and the temperature/humidity sensor 140J separated from each other by a predetermined distance 1103.

Figure 3:
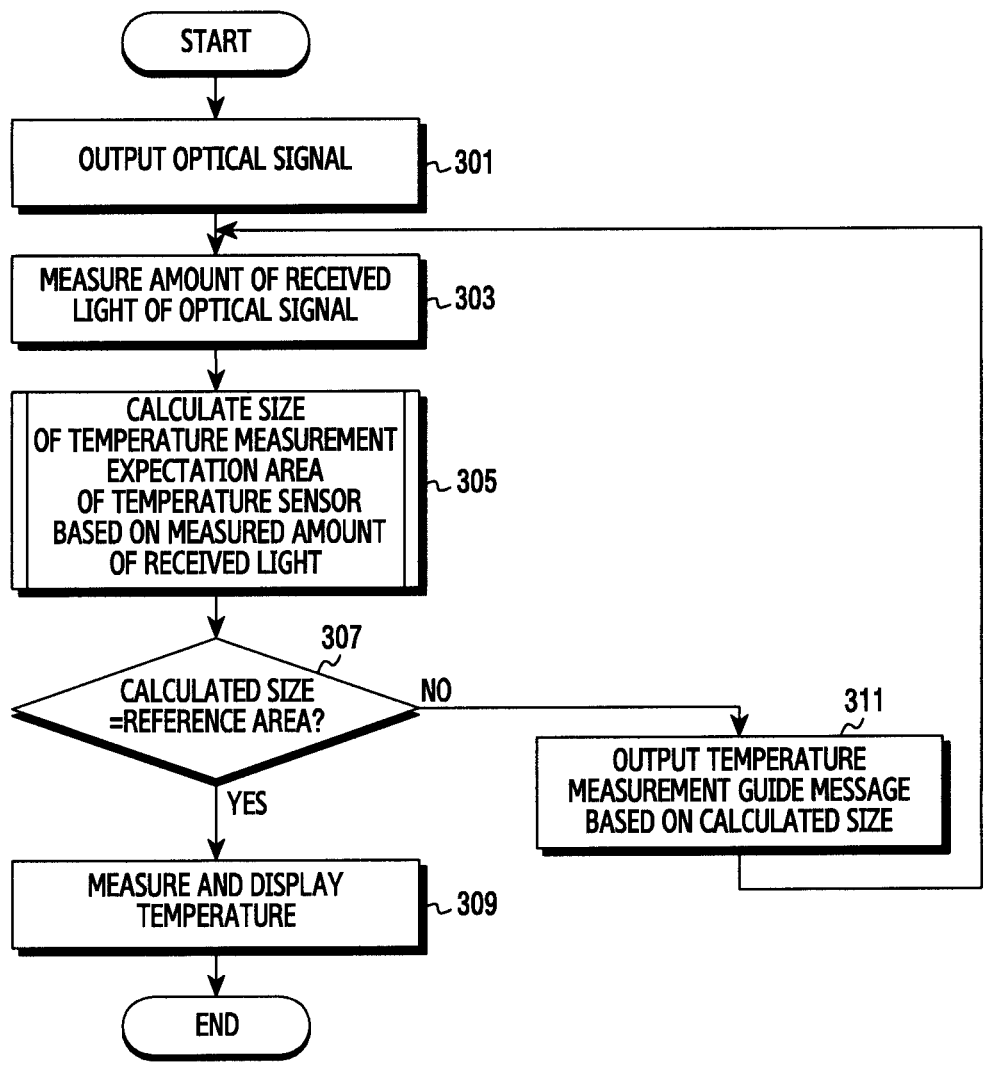
FIG. 3 illustrates a flowchart of a method for measuring a temperature in an electronic device according to a first embodiment of the present disclosure.

FIG. 3 illustrates a flowchart showing a method for measuring a temperature in an electronic device according to the first embodiment of the present disclosure.

Referring now to FIG. 3, in operation 301, when a temperature measurement is requested by the user, the at least one processor 110 may output an optical signal to the outside of the electronic device through the photo sensor (not shown), and then proceed to operation 303. For example, when a temperature measurement start menu of a temperature measurement application is selected by the user, the at least one processor 110 may determine that the temperature measurement is requested by the user. In another example, when a button for instructing to start the temperature measurement is selected by the user in the electronic device, the at least one processor 110 may determine that the temperature measurement is requested by the user.

In another example, when a gesture for instructing a start of the temperature measurement is inputted through a touch panel, a pen input, or an acceleration sensor in the electronic device, the at least one processor 110 may determine that the temperature measurement is requested by the user. In another example, when a user voice command to instruct to start the temperature measurement is inputted through the microphone 188, the at least one processor 110 may determine that the temperature measurement is requested by the user.

In another example, the at least one processor 110 may repeat operation 301 until the temperature measurement finishes or is canceled by the user.

In operation 303, the at least one processor 110 may measure an amount of received light of the optical signal and then proceed to operation 305. Herein, the amount of received light refers to an amount of light of the optical signal reflected off of an object. For example, the at least one processor 110 may receive the optical signal reflected off of the object through the photo sensor (not shown), and measure the amount of light of the received optical signal. In another example, the processor 110 may measure the amount of received light in the unit of a direct current level.

In operation 305, the processor 110 may calculate a size of a temperature measurement expectation area on the temperature/humidity sensor 140J based on the measured amount of received light, and then proceed to operation 307. Herein, the temperature measurement expectation area refers to a surface area of the object from which the temperature/humidity sensor 140J can measure radiant energy. In addition, since the amount of received light has a correlation with a distance between the photo sensor (not shown) and the object (for example, an inverse relationship or exponential function), the processor 110 may determine a measurement distance between the photo sensor (not shown) and the object using this property of light, and determine the size of the temperature measurement expectation area on the temperature/humidity sensor 140J using the determined measurement distance. Operation 305 will be explained in detail below with reference to FIG. 4.

In operation 307, the processor 110 may compare the calculated size of the temperature measurement expectation area and a reference area. Herein, the reference area refers to an area on which an optimum temperature can be measured by the temperature/humidity sensor 140J. The reference area may be pre-set considering the performance of the temperature/humidity sensor 140J.

As a result of the comparison, when the calculated size of the temperature measurement expectation area is equal to or similar to the reference area, the processor 110 proceeds to operation 309, and otherwise, proceeds to operation 311. For example, when a difference between the reference area and the size of the temperature measurement expectation area falls within 20% of the reference area, the processor 110 may determine that the calculated size of the temperature measurement expectation area is similar to the reference area.

When the processor 110 proceeds to operation 309, the processor 110 may measure the temperature using the temperature/humidity sensor 140J, and then output a temperature measurement guide message including the result of the measurement. For example, the processor 110 may determine the temperature measurement expectation area as a temperature measurement area, and measure a temperature on the determined temperature measurement area through the temperature/humidity sensor 140J. In addition, the processor 110 may generate and output a temperature measurement guide message including the measured temperature.

In another example, the processor 110 may output the temperature measurement guide messages informing the user of the start and end of the temperature measurement and the measured temperature in sequence through the audio module 180, or may display the temperature measurement guide messages on the display 160.

In another example, the processor 110 may transmit the temperature measurement guide message to an external device so that the external device can output the result of the measurement. For example, the processor 110 may generate the temperature measurement guide messages including the start and end of the temperature measurement on the object 1301 and the measured temperature in sequence, and transmit the temperature measurement guide messages to a wearable device (for example, a wearable watch) using short-distance communication.

Figure 13:
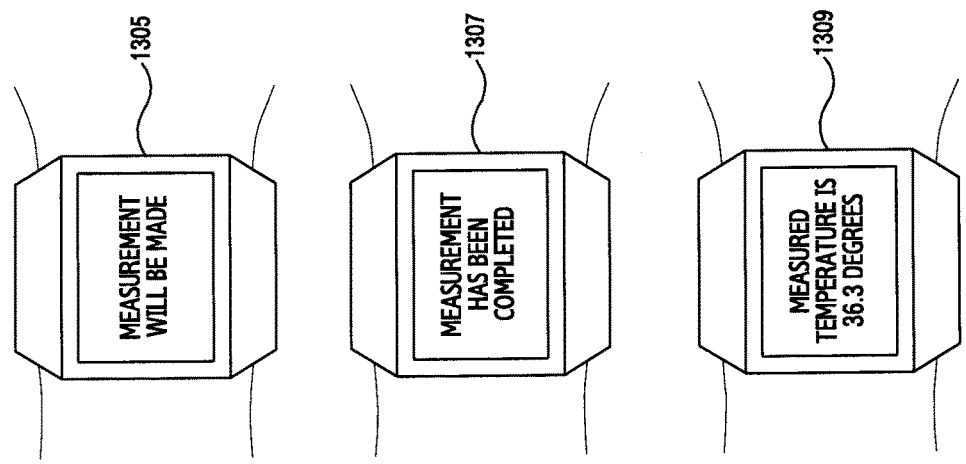
FIG. 13 illustrates a view showing a method for outputting a temperature measurement guide message in an electronic device according to the second embodiment of the present disclosure.
Figure 13:
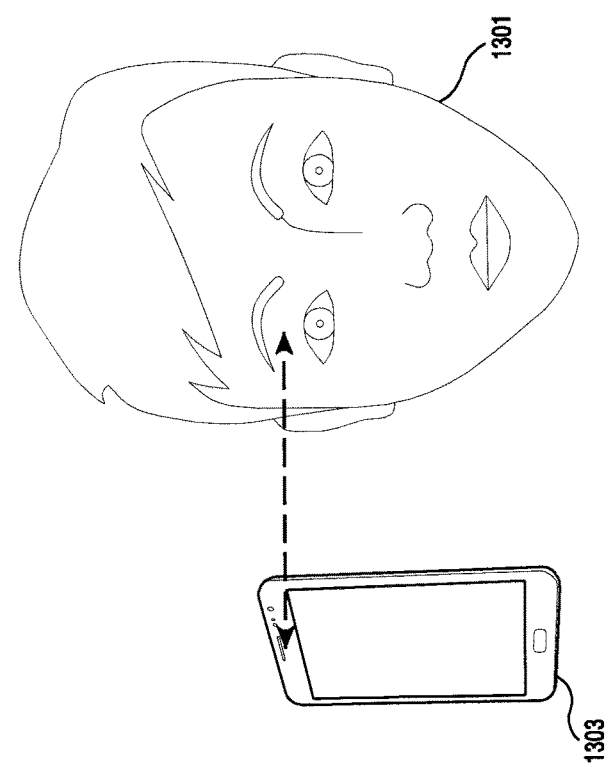

For example, the wearable device (for example, the wearable watch) may receive the temperature measurement guide messages, and may output the temperature measurement guide message informing of the start of the measurement using at least one of letters, a sound, a vibration, and an image as indicated by 1305 in FIG. 13. In another example, the wearable device (for example, the wearable watch) may output the temperature measurement guide message informing of the end of the measurement using at least one of letters, a sound, a vibration, and an image as indicated by 1307 in FIG. 13. In another example, the wearable device (for example, the wearable watch) may output the temperature measurement guide message informing of the measured temperature using at least one of letters, a sound, and an image as indicated by 1309 in FIG. 13.

On the other hand, when the processor 110 proceeds to operation 311, the processor 110 may output the temperature measurement guide message based on the calculated size of the temperature measurement expectation area, and then resumes operation 303. For example, the processor 110 may generate the temperature measurement guide message based on a difference between the calculated size of the temperature measurement expectation area and the reference area, and output the generated temperature measurement guide message. For example, when a result of subtracting the reference area from the calculated size of the temperature measurement expectation area is a negative number (−), the processor 110 may output a temperature measurement guide message for instructing the electronic device to move a little further away from the object. In another example, when a result of subtracting the reference area from the calculated size of the temperature measurement expectation area is a positive number (+), the processor 110 may output a temperature measurement guide message for instructing the electronic device to move a little closer to the object.

In another example, the processor 110 may transmit the temperature measurement guide message to an external device using short-distance wireless communication so that the external device can output the temperature measurement guide message.

Figure 4:
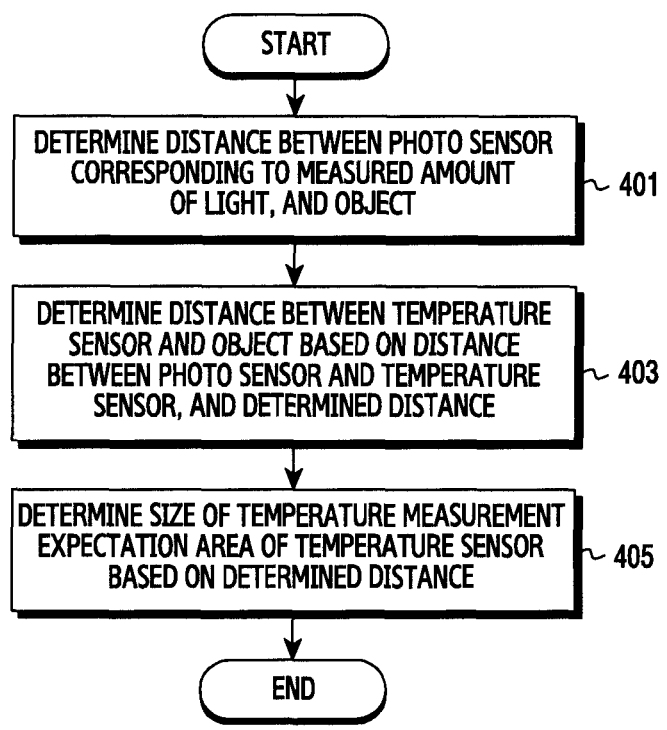
FIG. 4 illustrates a flowchart of a method for calculating a size of a temperature measurement expectation area in an electronic device according to an embodiment of the present disclosure.

FIG. 4 illustrates a flowchart showing a method for calculating a size of a temperature measurement expectation area in the electronic device according to an embodiment of the present disclosure. Hereinafter, operation 305 will be explained with reference to FIG. 4.

In operation 401, the processor 110 may determine a measurement distance between the photo sensor (not shown) and an object, which corresponds to a measured light reception amount, and then proceeds to operation 403. According to an embodiment, when measurement distances corresponding to light reception amounts are pre-stored, the processor 110 may detect the measurement distance corresponding to the measured light reception amount from among the stored distances. Herein, the measurement distances refer to distances between the photo sensor (not shown) and objects.

According to an embodiment, the memory 130 may store the distances between the photo sensor (not shown) and the objects in comparison to the light reception amounts in the form of a table or in the form of a graph shown in FIG. 9 (for example, in the form of at least one of a regression equation, a correlation equation, and a multidimensional equation). According to another embodiment, the memory 130 may store the distances between the photo sensor (not shown) and the objects in comparison to the light reception amounts according to color of each of the objects in the form of a table or in the form of a graph shown in FIG. 9.

For example, when an amount of light reflected off of an object disposed at first location 1005 of FIG. 10 and measured is a direct current level of 20000, and the color of the object is brown, the processor 110 may determine a measurement distance 1017 between the photo sensor (not shown) and the object as 9 mm based on a graph 901 of FIG. 9 which is stored in the memory 130.

In another example, when am amount of light reflected off of an object disposed at second location 1009 of FIG. 10 and measured is a direct current level of 9000, and the color of the object is brown, the processor 110 may determine a distance 1019 between the photo sensor (not shown) and the object as 15 mm based on the graph 901 of FIG. 9 which is stored in the memory 130. In another example, when an amount of light reflected off of an object disposed at third location 1013 of FIG. 10 and measured is a direct current level of 5000, and the color of the object is brown, the processor 110 may determine a distance 1021 between the photo sensor (not shown) and the object as 20 mm based on the graph 901 of FIG. 9 which is stored in the memory 130.

In operation 403, the processor 110 may determine a distance between the temperature/humidity sensor 140J and the object based on the determined measurement distance and a distance between the photo sensor (not shown) and the temperature/humidity sensor 140J, and then proceeds to operation 405. For example, when the rear surface of the portable terminal 1001 curves inwardly or outwardly, the processor 110 may determine the distance between the temperature/humidity sensor 140J and the object based on the determined measurement distance, the distance between the photo sensor and the temperature/humidity sensor 140J, and the shape of the rear surface of the portable terminal 1001.

In operation 405, the processor 110 may determine the size of the temperature measurement expectation area of the temperature/humidity sensor 140J based on the determined distance. For example, when the non-transitory memory 130 stores the sizes of the temperature measurement expectation areas corresponding to the distances between the temperature/humidity sensor 140J and the objects, the at least one processor 110 may detect the size of the area corresponding to the determined distance from among the stored sizes.

For example, when the distance 1017 between the temperature/humidity sensor 140J and the object disposed at first location 1005 is 9 mm, the processor 110 may determine an area 1007 of FIG. 10 as the size of the temperature measurement expectation area corresponding to 9 mm. In another example, when the distance between the temperature/humidity sensor 140J and the object disposed at second location 1009 is 15 mm, the processor 110 may determine an area 1011 of FIG. 10 as the size of the temperature measurement expectation area corresponding to 15 mm. In another example, when the distance 1021 between the temperature/humidity sensor 140J and the object disposed at third location 1013 is 20 mm, the processor 110 may determine an area 1015 of FIG. 10 as the size of the temperature measurement expectation area corresponding to 20 mm.

In the first embodiment, the size of the temperature measurement expectation area is estimated based on the distance between the electronic device and the object. However, the present disclosure is not limited to this. For example, since the size of the temperature measurement expectation area has a correlation with the amount of light reflected off of the object and measured through the photo sensor (not shown), the memory 130 may store the sizes of the temperature measurement expectation areas in comparison to the light reception amounts. In another example, the memory 130 may store the sizes of the temperature measurement expectation areas in comparison to the light reception amounts in the form of a table or in the form of a graph (for example, in the form of at least one of a regression equation, a correlation equation, and a multidimensional equation). In another example, the memory 130 may store the sizes of the temperature measurement expectation areas in comparison to the light reception amounts according to color of each of the objects in the form of a table or in the form of a graph. In this case, the at least one processor 110 may detect the size of the temperature measurement expectation area corresponding to the measured light reception amount from among the sizes of the plurality of temperature measurement expectation areas stored in the memory 130, without calculating the distance between the electronic device and the object.

In the first embodiment, a reference area is pre-set. However, the present disclosure is not limited to this. For example, the reference area may be set based on the size of the object. More specifically, when the object is a human body, the reference area, which is a size of an optimum temperature measurement area to measure a temperature, may vary according to a size of the human body. That is, the size of the optimum temperature measurement area for children may be different from the size of the optimum temperature measurement area for adults. Considering this feature, the at least one processor 110 may provide a child mode and an adult mode or a male mode and a female mode having a different reference area according to the size of the human body.

FIG. 9 illustrates graphs showing a change in the direct current level intensity according to a distance from the photo sensor according to an embodiment of the present disclosure.

Referring to FIG. 9, when the object is a human body, the graph 901 shows a measurement distance between the photo sensor (not shown) and the human body in comparison to the direct current level intensity of a light input amount according to a skin color.

Referring to graph 901, in a state in which the photo sensor (not shown) is in close contact with the human body, when the skin color is white, the direct current level of the light input amount is 59000 (903), and, when the skin color is brown, the direct current level of the light input amount is 55000 (905). When the skin color is black, the direct current level of the light input amount is 9000 (907).

As described above, since an absorbed amount of the optical signal varies according to the skin color of the human body, the light input amount varies. In particular, when the skin color of the human body is black, a relationship between the measurement distance between the photo sensor (not shown) and the human body, and the direct current level intensity of the light input amount may be expressed by a slightly curvilinear function as shown in graph 901 of FIG. 9. In this case, the processor at least one 110 may not exactly determine a measurement distance corresponding to a first light input amount. To solve this problem, the processor 110 may determine the measurement distance based on a light amount sensitivity of the optical signal rather than the light input amount of the optical signal. Herein, the light amount sensitivity refers to a ratio of a light input amount to an initial light input amount of the optical signal. Herein, the initial light input amount refers to an amount of light entering a light reception unit (not shown) of the photo sensor (not shown) when the electronic device is in contact with the surface of the object (for example, the skin). For example, the light amount sensitivity may be a ratio of a direct current level intensity of a first light input amount of a first optical signal to a direct current level intensity of the initial light input amount.

Referring to graph 909 of FIG. 9, if the amount of light sensitivity is set to a specific value, for example, 100% 911, when the electronic device is in contact with the human body, it can be seen that the light amount sensitivity sensitively reacts to the measurement distance rather than to the light input amount regardless of the skin color of the human body. Considering this feature, the at least one processor 110 may determine the measurement distance based on the light amount sensitivity rather than the light input amount. The types of skin color illustrated in FIG. 9 are merely an example to embody the present disclosure, and a factor on the other skin colors may be further included.

For convenience of explanation, the measurement distance between the photo sensor (not shown) and the human body has been described in comparison to the light amount sensitivity. However, the present disclosure is not limited to this. For example, the non-transitory memory 130 may store the size of the temperature measurement expectation area of the temperature/humidity sensor 140J in comparison to the light amount sensitivity in the form of a graph.

Hereinafter, a method for measuring a temperature based on an amount of a light sensitivity will be explained with reference to FIGS. 5 and 6.

Figure 5:
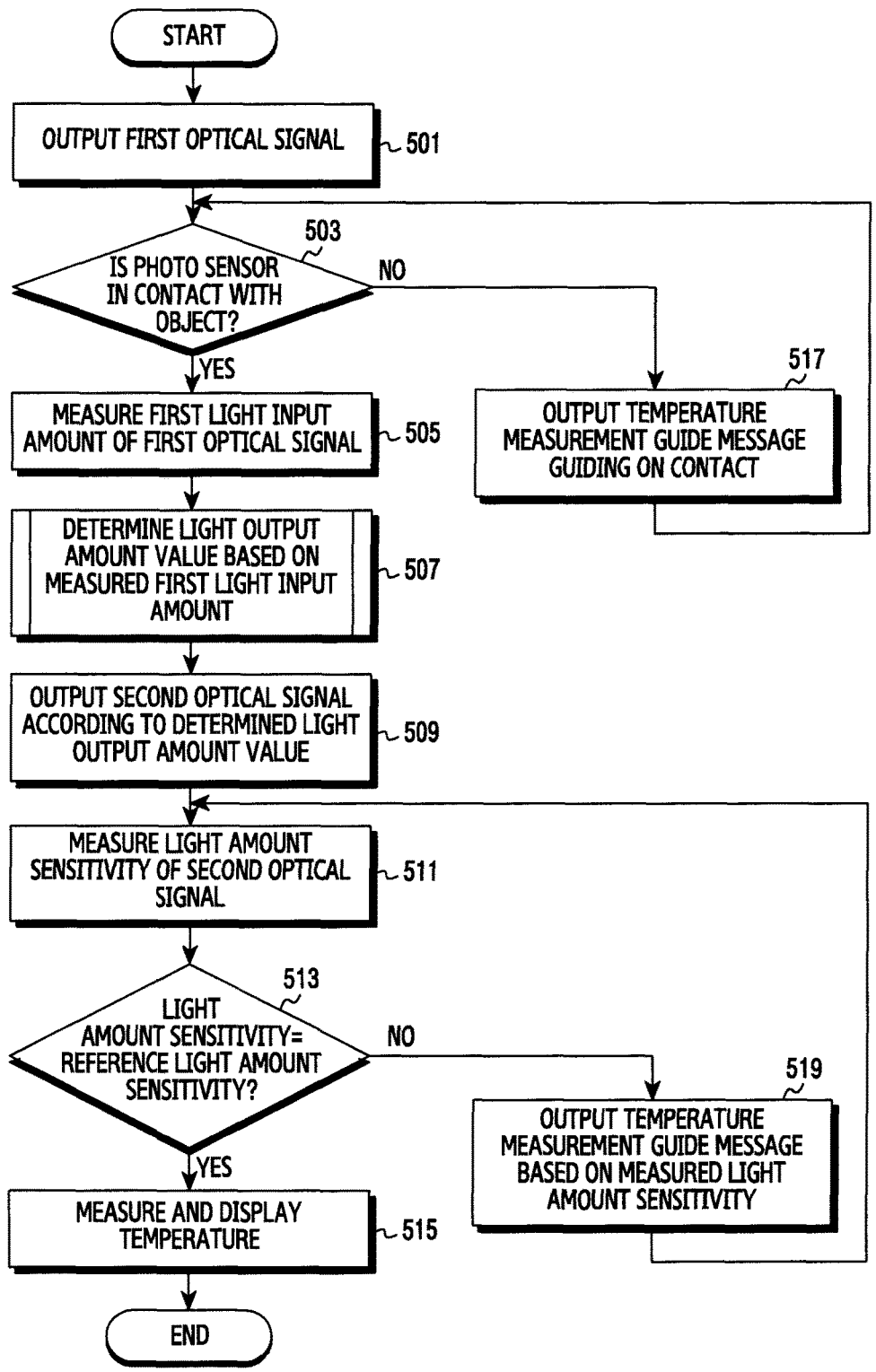
FIG. 5 illustrates a flowchart of a method for measuring a temperature in an electronic device according to a second embodiment of the present disclosure.

FIG. 5 illustrates a flowchart showing a method for measuring a temperature in the electronic device according to a second embodiment of the present disclosure.

Referring to FIG. 5, in operation 501, when a temperature measurement is requested by the user, the at least one processor 110 outputs a first optical signal to the outside of the electronic device through the photo sensor (not shown), and then proceeds to perform operation 503. Herein, the first optical signal refers to an optical signal which is outputted from the photo sensor (not shown) with a pre-set initial light amount value when the temperature measurement is requested.

For example, when a temperature measurement start menu of a temperature measurement application is selected by the user, the at least one processor 110 may determine that the temperature measurement is requested by the user. In another example, when a button for instructing to start the temperature measurement in the electronic device is selected by the user, the at least one processor 110 may determine that the temperature measurement is requested by the user.

In another example, when a gesture for instructing to start the temperature measurement is inputted through a touch panel, a pen input, or an acceleration sensor in the electronic device, the at least one processor 110 may determine that the temperature measurement is requested by the user. In another example, when a voice command to instruct to start the temperature measurement is inputted through the microphone 188, the at least one processor 110 may determine that the temperature measurement is requested by the user.

In another example, the at least one processor 110 may repeat operation 501 until the temperature measurement finishes or is canceled by the user.

In operation 503, the at least one processor 110 may determine whether the electronic device is in contact with an object or not. It may be determined whether the electronic device is in contact with the object by determining whether the electronic device is physically in contact with the object or not or evaluating proximity.

For example, the at least one processor 110 may determine whether the photo sensor (not shown) or a part of the electronic device having the photo sensor (not shown) attached thereto (for example, a housing, a cover, a protection unit, a display, a touch pad, or a guard) is in contact with the object or not. For example, the at least one processor 110 may activate the camera module 191, and may determine whether the photo sensor (not shown) or the part of the electronic device is in contact with the object or not by analyzing an image inputted from the camera module 191. For example, when the object is a human body, and an area corresponding to skin color of the human body is included in the image by a pre-set percent or more (for example, 80% of the entire image size), the processor 110 may determine that the photo sensor (not shown) or the part of the electronic device is in contact with the human body. In another example, when the image includes the skin color of the human body by less than the pre-set percent (for example, 80% of the entire image size), the at least one processor 110 may determine that the photo sensor (not shown) is not in contact with the human body. In another example, when a camera lens is hidden by the object, little or no light is received, and thus the brightness (or intensity) of the inputted image may be low. Therefore, when the brightness of the image inputted from the camera module 191 is less than or equal to a predetermined reference value (for example, 5%), the processor 110 may determine that the photo sensor (not shown) or the part of the electronic device is in contact with the human body.

In another example, when the photo sensor (not shown) is a PPG sensor, the processor 110 may determine whether the photo sensor (not shown) is in contact with the human body or not using an alternating current (AC) level intensity of a light reception amount of the first optical signal inputted through the PPG sensor. The PPG sensor may sense a change in an amount of blood flow of a blood vessel. When the PPG sensor is in contact with a human body, the AC level intensity may pulsate with reference to a specific value. For example, when the AC level intensity of the measured first optical signal pulsates, the processor 110 may determine that the photo sensor (not shown) or the part of the electronic device is in contact with the human body using the above-described characteristic of the PPG sensor. In another example, when the AC level intensity does not pulsate, the processor 110 may determine that the photo sensor (not shown) or the part of the electronic device is not in contact with a living body.

In another example, when the photo sensor (not shown) is the PPG sensor, the at least one processor 110 may determine whether the photo sensor (not shown) is in contact with the human body or not using a direct current (DC) level intensity of a light reception amount regarding the first optical signal inputted through the PPG sensor. Herein, the PPG sensor receives a higher intensity of a DC level as a distance between the sensor and an object decreases. When the PPG sensor or a part of a PPG sensor mounting area in the electronic device is in contact with the human body, the received DC level intensity is greater than or equal to a specific value (for example, a value corresponding to 60% of the maximum DC level intensity that can be measured by the PPG sensor). Therefore, when the received DC level intensity is greater than or equal to the specific value, the at least one processor 110 may determine that the photo sensor (not shown) and the part of the electronic device is in contact with the human body, considering the above-described characteristic of the PPG sensor. On the other hand, when the received DC level intensity is less than the specific value, the at least one e processor 110 may determine that the photo sensor (not shown) or the part of the electronic device is not in contact with the human body.

In another example, the at least one processor 110 may determine whether or not the photo sensor (not shown) or the part of the electronic device is in contact with the object using a sound wave. For example, the at least one processor 110 may generate a sound wave through the speaker 182 and receive the sound wave reflected off of the object through the microphone 188, and may measure the distance between the electronic device and the objet based on an intensity of the received sound wave.

As a result, when it is determined that the electronic device is in contact with the object, the processor 110 proceeds to perform operation 505, and otherwise, proceeds to perform operation 517.

Figure 12:
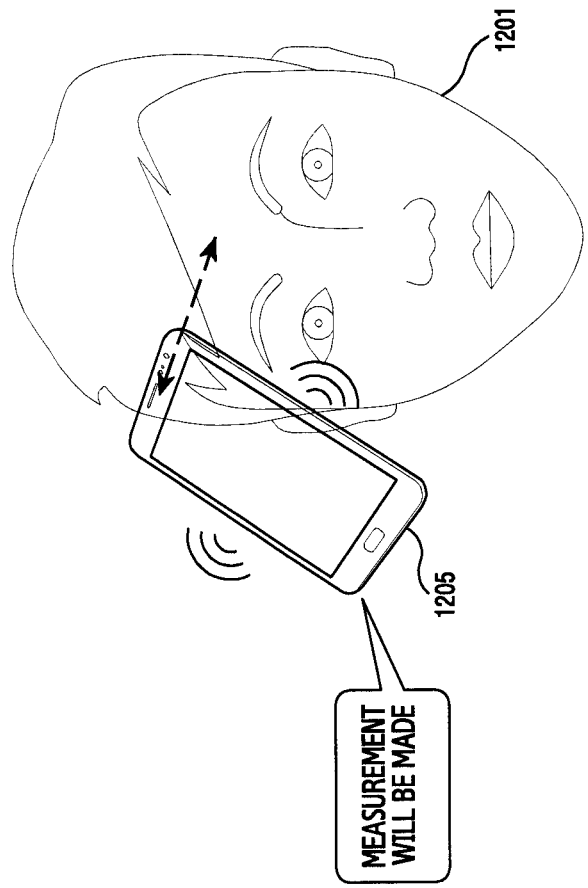
FIG. 12 illustrates a view showing a method for outputting a temperature measurement guide message in an electronic device according to the first embodiment of the present disclosure.
Figure 12:
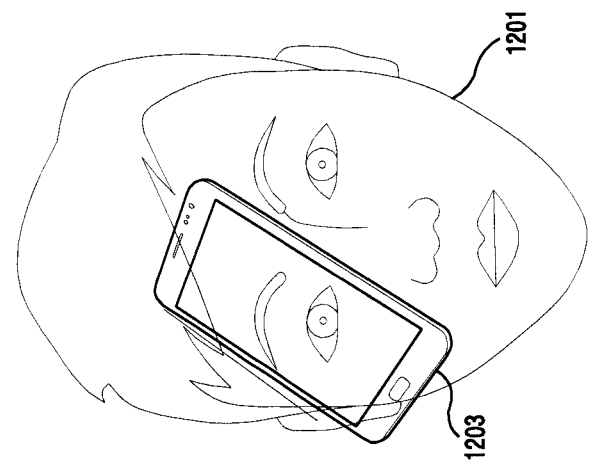

When the at least one processor 110 proceeds to perform operation 517, the processor 110 may output a temperature measurement guide message for guiding the user to bring the electronic device into contact with the object, and then resume operation 503. For example, as shown in FIG. 12, the at least one processor 110 may output the temperature measurement guide message for guiding the user to bring the portable terminal into contact with the object as a sound, letters, or an image through the audio module 180 or the display 160. In another example, the at least one processor 110 may transmit the temperature measurement guide message to an external device using short-distance communication so that the external device can output the temperature measurement guide message to guide the user to bring the portable terminal into contact with the object.

When the at least one processor 110 proceeds to perform operation 505, the at least one processor 110 may measure a first light input amount of the first optical signal, and then proceed to perform operation 507. Herein, the first light input amount refers to an amount of light of the optical signal inputted to the photo sensor (not shown) after the first optical signal has been reflected off of the object. For example, the at least one processor 110 may measure the first light input amount in the unit of a DC level.

In operation 507, the at least one processor 110 may determine a light output amount value for the photo sensor (not shown) based on the measured first light input amount, and proceed to perform operation 509. Operation 507 will be explained in detail below with reference to FIG. 6.

In operation 509, the at least one processor 110 may output a second optical signal according to the determined light output amount value through the photo sensor (not shown), and proceed to perform operation 511. In this case, for example, the at least one processor 110 may output a temperature measurement guide message to separate the electronic device from the object. In another example, the at least one processor 110 may transmit the temperature measurement guide message to an external device using short-distance communication so that the external device can output the temperature measurement guide message to separate the electronic device from the object.

In operation 511, the at least one processor 110 may measure a light amount sensitivity of the second optical signal, and then proceeds to operation 513. For example, the at least one processor 110 may measure the light amount sensitivity of the second optical signal by calculating a ratio of a second light input amount to the second light output amount of the second optical signal. In another example, the processor 110 may calculate a ratio of a DC level intensity of the second light input amount to a DC level intensity of the second light output amount by a percentage (%).

In operation 513, the at least one processor 110 may compare the measured light amount sensitivity and a reference light amount sensitivity. Herein, the reference light amount sensitivity refers to a light amount sensitivity corresponding to a distance between the electronic device and the object, or a location of the electronic device, in which the temperature/humidity sensor 140J can measure an optimum temperature. The reference light amount sensitivity may be pre-set considering the performance of the temperature/humidity sensor 140J.

As a result of the comparison, when the measured light amount sensitivity is equal to the reference light amount sensitivity, the at least one processor 110 may proceed to perform operation 515, and otherwise, may proceed to operation 519.

When the at least one processor 110 proceeds to perform operation 515, the at least one processor 110 may measure a temperature using the temperature/humidity sensor 140J, and then output a temperature measurement guide message including the result of the measurement. For example, as shown in FIG. 12, the at least one processor 110 may determine that the electronic device 1205 reaches an optimum location of the object 1201 to measure the temperature, and generate a temperature measurement guide message informing of the start of the measurement and output the temperature measurement guide message using at least one of a vibration, a sound, letters, and an image.

In another example, the at least one processor 110 may output the temperature measurement guide messages for informing of the start and end of the temperature measurement, and the measured temperature in sequence through the audio module 180, or may display the messages on the display 160.

In another example, the at least one processor 110 may transmit the temperature measurement guide message to an external device so that the external device can output the result of the measurement. For example, as shown in FIG. 13, the processor 110 may generate the temperature measurement guide messages including the start and end of the temperature measurement on the object 1301 and the measured temperature in sequence, and transmit the temperature measurement guide messages to a wearable device (for example, a wearable watch) using short-distance communication.

For example, the wearable device (for example, the wearable watch) may receive the temperature measurement guide messages, and may output the temperature measurement guide message informing of the start of the measurement using at least one of letters, a sound, a vibration, and an image as indicated by 1305 in FIG. 13. In another example, the wearable device (for example, the wearable watch) may output the temperature measurement guide message informing of the end of the measurement using at least one of letters, a sound, a vibration, and an image as indicated by 1307 in FIG. 13. In another example, the wearable device (for example, the wearable watch) may output the temperature measurement guide message informing of the measured temperature using at least one of letters, a sound, and an image as indicated by 1309 in FIG. 13.

On the other hand, when the at least one processor 110 proceeds to perform operation 519, the at least one processor 110 may generate and output a temperature measurement guide message based on the measured light amount sensitivity, and then resumes operation 511. For example, when the non-transitory memory 130 stores measurement distances corresponding to light amount sensitivities, the at least one processor 110 may detect a measurement distance corresponding to the measured light amount sensitivity and a reference measurement distance corresponding to the reference light amount sensitivity, generates a temperature measurement guide message based on a difference between the reference measurement distance and the measurement distance, and output the generated temperature measurement guide message. For example, when a result of subtracting the reference measurement distance from the detected measurement distance is a negative number (−), the at least one processor 110 may output a temperature measurement guide message for instructing the electronic device to move a little further away from the object. In another example, when a result of subtracting the reference measurement distance from the calculated measurement distance is a positive number (+), the processor 110 may output a temperature measurement guide message for instructing the electronic device to move a little closer to the object.

In another example, when the non-transitory memory 130 stores sizes of temperature measurement expectation areas corresponding to light amount sensitivities, the at least one processor 110 may detect a size of a temperature measurement expectation area corresponding to the measured light amount sensitivity and a reference area corresponding to the reference light amount sensitivity, generate a temperature measurement guide message based on a difference between the reference area and the size of the temperature measurement expectation area, and output the generated temperature measurement guide message. For example, when a result of subtracting the reference area from the detected size of the temperature measurement expectation area is a negative number (−), the at least one processor 110 may output a temperature measurement guide message for instructing the electronic device to move a little further away from the object. In another example, when a result of subtracting the reference area from the calculated size of the temperature measurement expectation area is a positive number (+), the at least one processor 110 may output a temperature measurement guide message for instructing the electronic device to move a little closer to the object.

In another example, the at least one processor 110 may transmit the temperature measurement guide messages to an external device using short-distance wireless communication so that the external device can output the generated temperature measurement guide messages.

Figure 6:
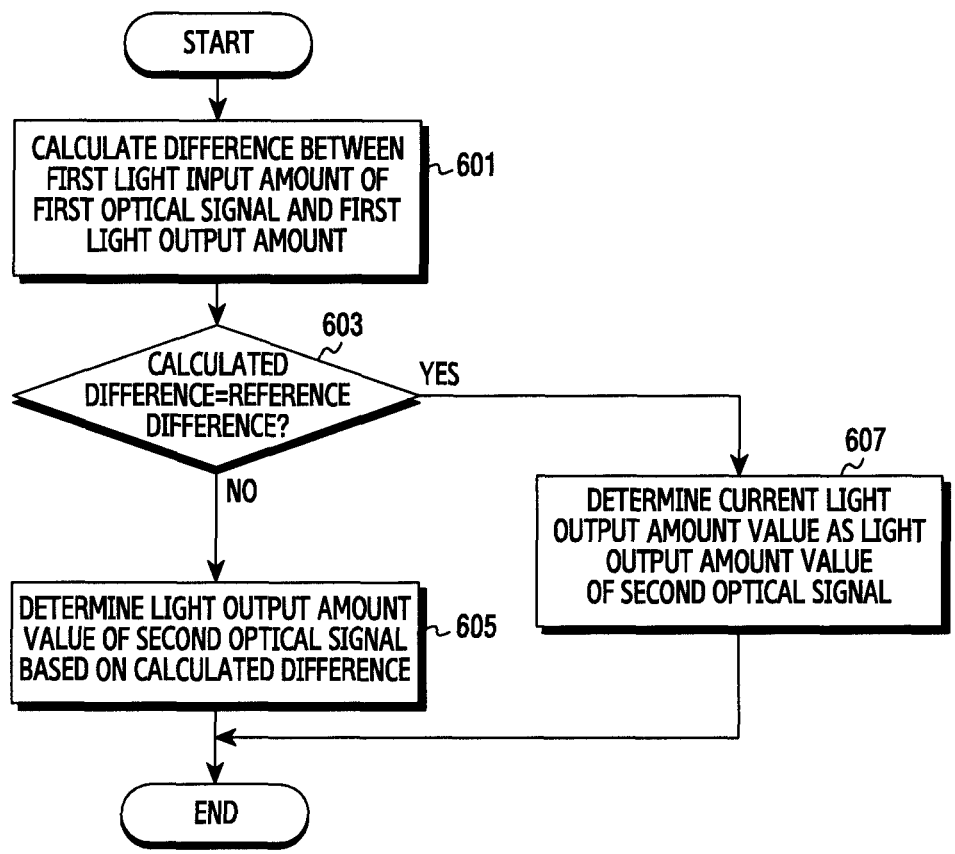
FIG. 6 illustrates a flowchart of a method for determining a light output amount value in an electronic device according to an embodiment of the present disclosure.

FIG. 6 illustrates a flowchart showing a method for determining a light output amount value in the electronic device according to an embodiment of the present disclosure. Herein below, operation 507 will be explained with reference to FIG. 6.

In operation 601, the at least one processor 110 may calculate a difference between the first light input amount of the first optical signal and the first light output amount of the first optical signal, and then proceed to perform operation 603. For example, at least one processor 110 may calculate the difference by subtracting a DC level intensity of the first light input amount from a DC level intensity of the first light output amount, or may calculate a ratio between the DC level intensity of the first light output amount and the DC level intensity of the first light input amount.

In operation 603, the at least one processor 110 may compare the calculated difference and a reference value. Herein, the reference value refers to a difference between the first light output amount and the first light input amount when the light amount sensitivity of the first optical signal reaches a specific value, and may be pre-stored in the memory 130. For example, when the specific value is 100%, the reference value may be '0.'

As a result of the comparison, when the calculated difference is equal to the reference value, the processor 110 may proceed to operation 607, and otherwise, proceed to operation 605.

When the processor 110 proceeds to operation 607, the processor 110 may determine a current light output amount value of the first optical signal as a light output amount value of the second optical signal. For example, when the current light output amount is the initial light amount value, the processor 110 may determine the initial light amount value as the light output amount value of the second optical signal.

On the other hand, when the at least one processor 110 proceeds to operation 605, the processor 110 may determine the light output amount value of the second optical signal based on the calculated difference. For example, when the calculated difference is a DC level intensity of 10000, the at least one processor 110 may determine the light output amount value of the second optical signal considering the DC level intensity of 10000.

In FIG. 6, the at least one processor 110 sets a light output amount value of a light emission unit (not shown) of the photo sensor (not shown) based on a difference between the first amount of light output and the amount of the first light input. However, the present disclosure is not limited to this method. For example, the processor 110 may set a specific value (for example, a size or intensity of a signal received through the light reception unit (not shown) of the photo sensor (not shown)) related to the first light input amount of the first optical signal, and, when a specific condition (for example, at least one of the case where a driving command of the temperature/humidity sensor 140J is inputted or the case where contact of the electronic device with a living body is detected) is satisfied, the at least one processor 110 may adjust a size or intensity of a signal related to the amount of the first light output of the first optical signal (for example, a voltage or a current of a signal related to the amount of the first light output, or a voltage level or a current level related to illuminance or light emission sensed the photo sensor (not shown) (for example, the light emission unit (not shown)).

In addition, the at least one processor 110 may measure the amount of the first light input of the first optical signal according to the adjustment, adjust the size or intensity of the signal related to the amount of the first light output of the first optical signal until the measured value reaches a specific value or a similar value, and, when the measurement value of the amount of the first light input reaches the specific value or the similar value, determine the size or intensity of the corresponding signal as the amount of light output amount value of the second optical signal. Herein, the similar value refers to a value which is included in a pre-set range with reference to the specific value.

In the second embodiment, the at least one processor 110 determines whether to measure a temperature based on the light amount sensitivity of the optical signal. However, the processor 110 may determine whether to measure a temperature based on other criteria. For example, as in the first embodiment, the at least one processor 110 may determine whether or not to measure a temperature based on the size of a temperature measurement area of the temperature/humidity sensor 140J rather than amount of the light sensitivity.

Figure 7:
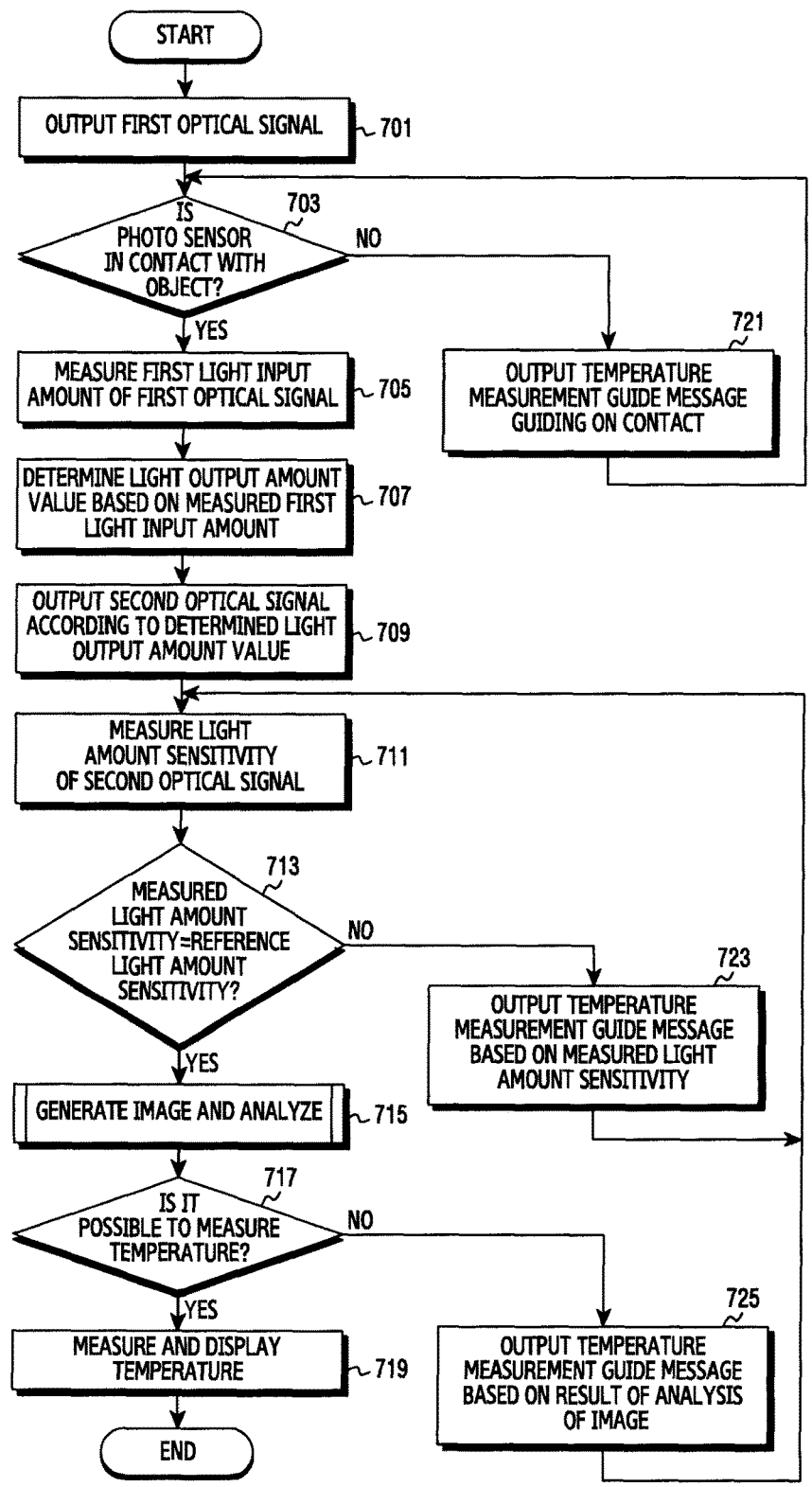
FIG. 7 illustrates a flowchart of a method for measuring a temperature in an electronic device according to a third embodiment of the present disclosure.

FIG. 7 illustrates a flowchart showing a method for measuring a temperature in the electronic device according to a third embodiment of the present disclosure.

Operations 701 to 711 and 721 shown in FIG. 7 correspond to operations 501 to 511 and 517 of FIG. 5. Therefore, operations 701 to 711 and 721 will not be explained, and the other operations will be explained herein below.

In operation 713, the at least one processor 110 may compare the amount of measured light sensitivity and the amount of reference light sensitivity. As a result of the comparison, when the amount of measured light sensitivity is not equal to the amount of reference light sensitivity or a difference between the measured amount of light t sensitivity and the reference amount of light sensitivity exceeds a pre-set range, the at least one processor 110 may proceed to perform operation 723.

When the at least one processor 110 proceeds to perform operation 723, the at least one processor 110 may generate and output a temperature measurement guide message based on the measured light amount sensitivity, and then resume operation 711.

According to an embodiment, as a result of the comparison of the amount of measured light sensitivity and the amount of reference light sensitivity in operation 713, when the amount of measured light sensitivity is equal to the amount of reference light sensitivity or the difference between the two values falls within the pre-set range, the processor 110 may proceed to perform operation 719.

According to another embodiment, as a result of the comparison of the amount of measured light sensitivity and the amount of reference light sensitivity in operation 713, when the amount of measured light sensitivity is equal to the amount of reference light sensitivity, or the difference between the two values falls within the pre-set range, the at least one processor 110 proceeds to perform operation 715.

When the at least one processor 110 performs operation 715, the at least one processor 110 may generate an image through the camera module 191 to determine whether or not an ambient environment is suitable to measure a temperature, analyze the generated image, and then proceed to perform operation 717. Operation 715 will now be explained in detail below with reference to FIG. 8.

In operation 717, the at least one processor 110 may determine whether it is possible to measure a temperature based on the result of the analysis of the image in operation 715. As a result of the determination, when it is possible to measure the temperature, the at least one processor 110 may proceed to perform operation 719, and otherwise, proceed to perform operation 725.

When the at least one processor 110 proceeds to perform operation 725, the at least one processor 110 may generate and output a temperature measurement guide message based on the result of the analysis of the image, and then resume operation 711. For example, where there are impurities in the image of the temperature measurement area, the at least one processor 110 may generate and output a temperature measurement guide message to remove the impurities from the temperature measurement area. For example, when there is hair in the image of the temperature measurement area, the at least one processor 110 may generate and output a temperature measurement guide message to remove the hair.

In another example, the at least one processor 110 may determine a direction in which hair or eyebrows exist, or a direction in which only skin exists, by analyzing the image. In another example, the at least one processor 110 may determine whether the distance between the electronic device and the object is a distance corresponding to a suitable size of the temperature measurement area or not by analyzing the image of the extracted temperature measurement area, and determining the location and size of an object (for example, at least one of eyes, eyebrows, nose, or hair) included in the corresponding image.

Based on the result of the determination, the at least one processor 110 may guide the user to move the electronic device in a particular direction by using at least one sound device or at least one haptic device. For example, the at least one processor 110 may guide the user in the particular direction using a stereo sound or a voice through speakers placed on the left and right of the electronic device. In another example, when the electronic device is provided with a plurality of haptic devices, the at least one processor 110 may control dynamics or a tempo of each haptic device differently to guide the user with regard to a moving direction, a moving distance, etc. of the electronic device.

In another example, the at least one processor 110 may transmit the generated temperature measurement guide message to an external device using short-distance wireless communication so that the external device can output the temperature measurement guide message.

On the other hand, when the at least one processor 110 proceeds to perform operation 719, the at least one processor 110 may measure the temperature using the temperature/humidity sensor 140J, and then output a temperature measurement guide message including the result of the measurement.

Figure 8:
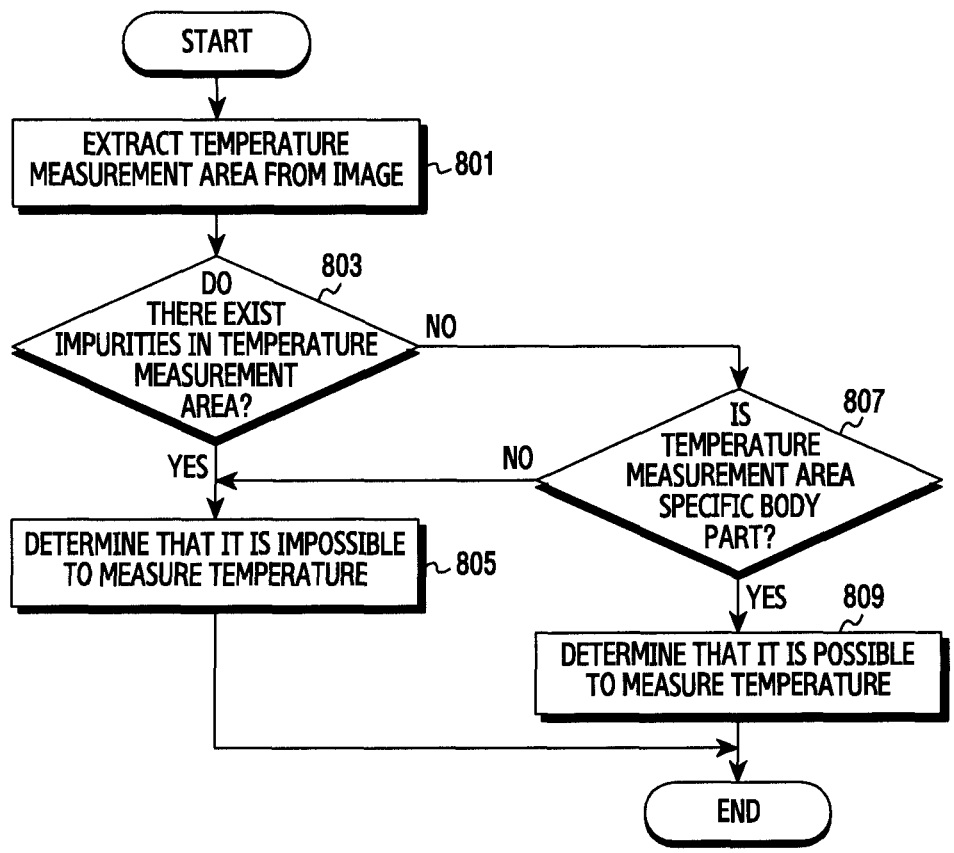
FIG. 8 illustrates a flowchart of a method for determining an ambient environment in an electronic device according to an embodiment of the present disclosure.

FIG. 8 illustrates a flowchart showing a method for determining an ambient environment in the electronic device according to an embodiment of the present disclosure. Herein below, operation 715 will be explained with reference to FIG. 8.

In operation 801, the at least one processor 110 may extract the temperature measurement area from the image, and then proceed to perform operation 803. For example, the at least one processor 110 may determine the temperature measurement area of the temperature/humidity sensor 140J from the image based on an image sensor magnification of the camera module 191, a distance between the camera module 191 and the temperature/humidity sensor 140J, and the measurement distance between the object and the temperature/humidity sensor 140J, and may extract an image of the determined temperature measurement area.

In another example, the at least one processor 110 may determine the temperature measurement area of the temperature/humidity sensor 140J from the image based on the image sensor magnification of the camera module 191, and the size of the temperature measurement expectation area measured through the camera module 191 and the photo sensor (not shown), and may extract the image of the determined temperature measurement area. In another example, the at least one processor 110 may determine the temperature measurement area of the temperature/humidity sensor 140J from the image based on the image sensor magnification of the camera module 191, and a distance and an angle between the camera module 191 and the temperature/humidity sensor 140J, and may extract the image of the determined temperature measurement area.

In performing operation 803, the at least one processor 110 may determine whether there are impurities in the extracted image of the temperature measurement area. For example, the processor 110 may analyze the extracted image of the temperature measurement area, and determine whether there are eyebrows, hair, or an object hindering temperature measurement in the image.

As a result of the determination, when there are impurities in the image of the temperature measurement area, the at least one processor 110 may determine that impurities are present in the temperature measurement area, and then proceed to perform operation 805, and otherwise, proceed to perform operation 807.

When the at least one processor 110 proceeds to perform operation 807, the processor 110 may determine whether there is a specific body part present in the temperature measurement area. In this case, the at least one processor 110 may determine whether there is a specific body part in the temperature measurement area by comparing the extracted image of the temperature measurement area and a pre-stored specific body part, or using other methods of identifying a specific body part. Herein, the specific body part refers to a body part from which a temperature can be measured accurately, and for example, may be a part in which temporal coronary arteries are located or a philtrum.

As a result of the determination, when the specific body part is present in the temperature measurement area, the processor 110 may proceed to perform operation 809, and otherwise, proceed to perform operation 805.

When the at least one processor 110 proceeds to perform operation 805, the at least one processor 110 may determine that it is impossible for the temperature/humidity sensor 140J to measure a temperature. On the other hand, when the processor 110 proceeds to perform operation 809, the at least one processor 110 may determine that it is possible for the temperature/humidity sensor 140J to measure a temperature.

In the third embodiment, the image analysis operation is performed to determine whether the ambient environment is to measure a temperature is performed when the light amount sensitivity of the optical signal is equal to the amount of reference light sensitivity. However, this is merely an example and the appended claims are not so not limited.

FIG. 10 illustrates a view showing a change in the temperature measurement area according to a distance between the electronic device and an object according to an embodiment of the present disclosure.

Referring now to FIG. 10, the electronic device may be a portable terminal 1001, and the portable terminal 1001 may include the photo sensor (not shown) and the temperature/humidity sensor 140J which are separated from each other by a predetermined distance 1003. The photo sensor (not shown) may include a light emission unit (not shown) and a light reception unit (not shown), and output an optical signal to the object through the light emission unit (not shown) and receive the optical signal reflected off of the object through the light reception unit (not shown).

According to an embodiment, the at least one processor 110 may measure an amount of light of an inputted optical signal, determine a distance between the photo sensor (not shown) and the object based on the measured amount of light, and determine a size of a temperature measurement expectation area of the temperature/humidity sensor 140J based on the determined distance.

For example, when the object is located on a first location 1005, the at least one processor 110 may determine the distance between the photo sensor (not shown) and the object as a first distance 1017, and determine the temperature measurement expectation area of the temperature/humidity sensor 140J as a first area 1007 based on the determined first distance 1017. In another example, when the object is located on a second location 1009, the at least one processor 110 may determine the distance between the photo sensor (not shown) and the object as a second distance 1019, and determine the temperature measurement expectation area of the temperature/humidity sensor 140J as a second area 1011 based on the determined second distance 1019. In another example, when the object is located on at third location 1013, the at least one processor 110 may determine the distance between the photo sensor (not shown) and the object as a third distance 1021, and determine the temperature measurement expectation area of the temperature/humidity sensor 140J as a third area 1015 based on the determined first distance 1021.

In another example, the at least one processor 110 may measure the amount of light of the inputted optical signal, and may directly determine the size of the temperature measurement expectation area of the temperature/humidity sensor 140J based on the measured amount of light. For example, since the size of the temperature measurement expectation area of the temperature/humidity sensor 140J is determined by a sensing range of the temperature/humidity sensor 140J (for example, a sensing angle and a sensing distance rage of the temperature/humidity sensor 140J), a correlation between the amount of measured light and the size of the temperature measurement expectation area may be obtained by conducting experiments, etc. The memory 130 may store the obtained correlation in the form of a table, a mathematical equation, or a graph. In this case, the at least one processor 110 may determine the size of the temperature measurement expectation area corresponding to the measured amount of light based on the stored data. For example, when the object is located on the first location 1005, the processor 110 may measure the amount of input light reflected off of the object, and determine the size of the temperature measurement expectation area corresponding to the measured amount of input light as the first area 1007 based on the pre-stored correlation between the amount of light and the size of the temperature measurement expectation area. In another example, when the object is located on the second location 1009, the processor 110 may measure the amount of input light reflected off of the object, and determine the size of the temperature measurement expectation area corresponding to the amount of measured amount of input light as the second area 1011 based on the pre-stored correlation between the amount of light and the size of the temperature measurement expectation area. In another example, when the object is located on the third location 1013, the processor 110 may measure the amount of input light reflected off of the object, and determine the size of the temperature measurement expectation area corresponding to the measured amount of input light as the third area 1015 based on the pre-stored correlation between the amount of light and the size of the temperature measurement expectation area.

FIG. 11 illustrates a side view showing a wearable device according to an embodiment of the present disclosure.

Referring now to FIG. 11, the electronic device may be a wearable device, for example, a wearable watch 1101, and the wearable watch device 1101 may include the photo sensor (not shown) and the temperature/humidity sensor 140J which are separated from each other by a predetermined distance 1103.

FIG. 12 illustrates a view showing a method for outputting a temperature measurement guide message in the electronic device according to the first embodiment of the present disclosure.

When a temperature measurement is requested, the at least one processor 110 may output a temperature measurement guide message to bring the electronic device into contact with a face 1201. In addition, when the electronic device is brought into contact with the face 1201 by the user (1203) as shown in FIG. 12, the at least one processor 110 may adjust an amount of light output received by the photo sensor (not shown), and then output a temperature measurement guide message to move the electronic device away from the face 1201. In addition, the at least one processor 110 may continue measuring an amount of a light input of the optical signal, and determine an amount of light sensitivity of the optical signal or a size of a temperature measurement expectation area of the temperature/humidity sensor 140J using the amount of measured light input.

In addition, when the amount of determined light sensitivity or the size of the temperature measurement prediction area satisfies a pre-set criterion, the at least one processor 110 may determine that the electronic device 1205 is at a distance suitable to measure the temperature from the object. In addition, the at least one processor 110 may output a temperature measurement guide message informing the start of the temperature measurement using at least one or more of a vibration and a sound.

FIG. 13 illustrates a view showing a method for outputting a temperature measurement guide message in the electronic device according to the second embodiment of the present disclosure.

As shown in FIG. 13, while measuring the temperature of an object 1301, the electronic device 1303 may transmit a temperature measurement guide message to a wearable device so that the wearable device communicating with the electronic device 1303 can output the temperature measurement guide message. In addition, the wearable device may display the received temperature measurement guide message.

When the temperature measurement starts, the wearable device may receive a temperature measurement guide message 1305 informing of the start of the temperature measurement from the electronic device 1303, and display the temperature measurement guide message. In addition, when the temperature measurement finishes, the wearable device may receive a temperature measurement guide message 1307 informing of the end of the temperature measurement from the electronic device 1303, and display the temperature measurement guide message. In addition, the wearable device may receive a temperature measurement guide message 1309 including the result of the temperature measurement from the electronic device 1303, and display the temperature measurement guide message.

Figure 14:
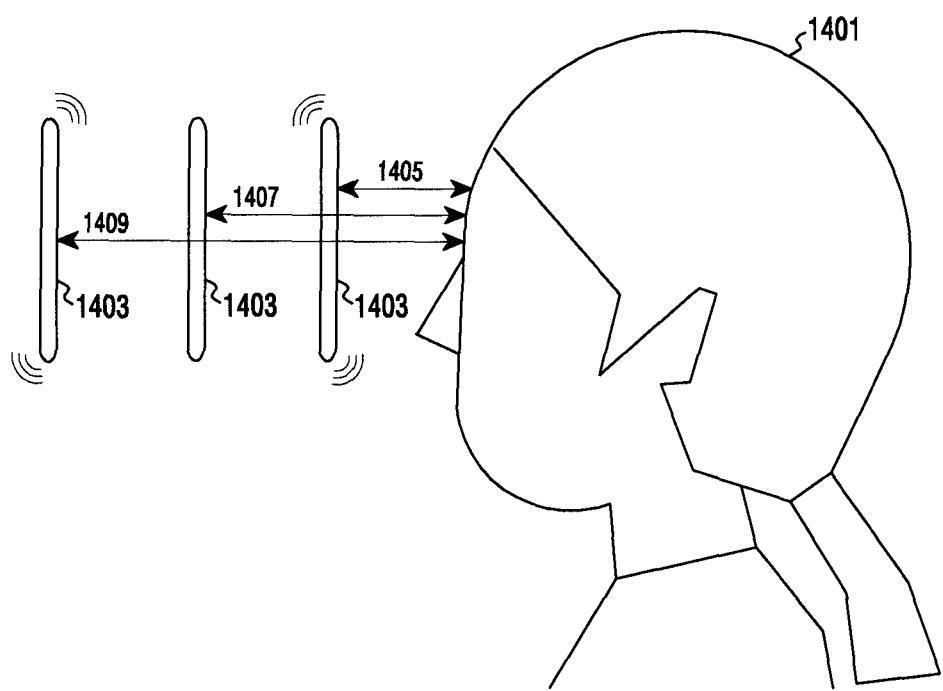
FIG. 14 illustrates a view showing a method for outputting a temperature measurement guide message in an electronic device according to the third embodiment of the present disclosure.

FIG. 14 illustrates a view showing a method for outputting a temperature measurement guide message in the electronic device according to the third embodiment of the present disclosure.

The electronic device 1403 may adjust a vibration intensity based on a difference between the size of the temperature measurement expectation area of the electronic device 1403 and the reference area, and output the vibration, so that the temperature measurement guide message can have a haptic effect.

For example, when the current location of the electronic device 101 is a location 1409 or a location 1405 in which the measured size of the temperature measurement expectation area exceeds or less than the reference area or a reference area range (for example, 85 to 115% of the reference area) corresponding to the reference distance 1407, the at least one processor 110 may output a temperature measurement guide message meaning that the electronic device does not reach the reference distance or a measurement reference location 1407 through a vibration of the motor 198. In addition, when the size of the temperature measurement expectation area is identical to the reference area, the at least one processor 110 may output a temperature measurement guide message meaning that the electronic device 1403 reaches the reference distance or the measurement reference location 1407 by stopping the vibration of the motor 198.

In addition, the electronic device 1403 may guide the user in a moving direction of the electronic device 1403 by adjusting a vibration intensity considering a change in the measurement distance or measurement location between the electronic device 1403 and the object 1401 with reference to the reference distance or the measurement reference location 1407. For example, the at least one processor 110 may gradually reduce or increase the vibration intensity as a difference between the size of the temperature measurement expectation area and the reference area gets closer to 0. In addition, the at least one processor 110 may gradually increase or decrease the vibration intensity as the difference between the size of the temperature measurement expectation area and the reference area gets further away from 0.

According to various embodiments, the at least one processor 110 may measure the amount of light of the inputted optical signal, and determine a measurement period of the photo sensor (not shown) based on the measured amount of light. For example, as the amount of measured light input gets closer to an amount of light corresponding to a pre-set range (for example, the reference area), the processor 110 may increase the frequency of light emission or measurement of the photo sensor (not shown). In another example, as the measured light input amount gets further away from the amount of light corresponding to the pre-set range, the at least one processor 110 may reduce the frequency of light emission or measurement of the photo sensor (not shown). When a light source has a visible ray band, the at least one processor 110 may control the photo sensor (not shown) according to the measured amount of light, thereby improving efficiency of the photo sensor (not shown) and reducing unnecessary power consumption. In another example, as a light reception ratio gets closer to the maximum light reception ratio, the at least one processor 110 may increase the frequency of light emission/measurement of the photo sensor (not shown), and, as the light reception ratio deteriorates below a pre-set value, the at least one processor 110 may reduce the frequency of light emission/measurement. That is, when the electronic device is closer to skin, the at least one processor 110 may increase the frequency of light emission/measurement of the photo sensor (not shown), and, when the electronic device moves away from the object by more than a predetermined distance, or there is a hair present in the temperature measurement expectation area, the at least one processor 110 may reduce the frequency of light emission/measurement.

According to various embodiment, since the size of the temperature measurement expectation area of the temperature/humidity sensor 140J is determined by a sensing range of the temperature/humidity sensor 140J (for example, a sensing angle and a sensing distance rage of the temperature/humidity sensor 140J), a correlation between the amount of measured light and the size of the temperature measurement expectation area may be obtained by conducting experiments, etc. The memory 130 may store the obtained correlation in the form of a table, a mathematical equation, or a graph. In this case, the at least one processor 110 may determine the size of the temperature measurement expectation area corresponding to the measured amount of light based on the stored data.

The apparatus and method for measuring a temperature in the electronic device according to various embodiments of the present disclosure can provide a guide according to a change in the distance between the electronic device and a temperature measurement examinee. In addition, the apparatus and method for measuring a temperature in the electronic device according to various embodiments of the present disclosure can determine an appropriate measurement location between the electronic device and the temperature measurement examinee, or can guide on the appropriate measurement location. In addition, the apparatus and method for measuring a temperature in the electronic device according to various embodiments of the present disclosure can determine an appropriate measurement location between the electronic device and a temperature measurement object regardless of color of the temperature measurement object.

The present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, various embodiments disclosed in this document are only for the description and understanding of technical contents and do not limit the present disclosure. Accordingly, the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a compact disc ROM (CD-ROM), a DVD, a magnetic tape, a RAM, a floppy disk, a hard disk, or a magneto-optical disk or computer code downloaded over a network originally stored on a remote recording medium or a non-transitory machine readable medium and to be stored on a local recording medium for execution by hardware such as by at least one processor, so that the methods described herein can be loaded into hardware for rendering via such software that is stored on the recording medium using a general purpose computer, or a special processor or in programmable or dedicated hardware, such as an application specific integrated circuit (ASIC) or field programmable gate array (FPGA). As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium including machine executable code that is loaded into and executed by hardware for operation, in accordance with statutory subject matter under 35 U.S.C. § 101 and do not constitute software per se.

Further, the 'module' may be provided as a computer-readable storage media storing one or more programs (or programming modules and applications). For instance, the software may be implemented by an instruction stored in a computer-readable storage media in a form of the programming module. The one or more programs may include instructions that when loaded into hardware enabling an electronic device to execute methods according to an embodiment stated in the claims and/or specification of the present disclosure. If the instruction is executed by hardware, such as by one or more processors (e.g., the processor 110), the one or more processors may perform a function corresponding to the instruction. The computer-readable storage media may be, for example, the memory 230. At least a part of the programming module may be, for example, implemented (e.g., executed) by the processor 210. At least a part of the programming module may include, for example, a module, a program, a routine, sets of instructions, or a process, etc. for performing one or more functions.

The computer-readable recording media includes a magnetic media such as a hard disk, a floppy disk, and a magnetic tape, an optical media such as a CD-ROM and a DVD, a Magneto-Optical Media such as a floptical disk, and a hardware device specially configured to store and perform a program instruction (e.g., a programming module) such as a ROM, a RAM, a flash memory, etc., an EEPROM, a magnetic disc storage device or an optical storage device of other form, and a magnetic cassette. Or, the program instruction may be stored in a memory implemented by a combination of some or all of them. Also, each implementation memory may be also included in plural. Also, the program instruction includes not only a mechanical language code such as a code made by a compiler but also a high-level language code executable by a computer using an interpreter, etc.

Further, the program instruction may be stored in an attachable storage device accessible to an electronic device through a communication network such as the Internet, an intranet, a local area network (LAN), a wireless LAN (WLAN) and a storage area network (SAN) or a communication network implemented by a combination of them. This storage device may connect to the electronic device through an external port. Also, a separate storage device on the communication network may connect to a portable electronic device as well. The aforementioned hardware device may be configured to operate as one or more software modules so as to perform operations according to various embodiments of the present disclosure, and vice versa.

The module or programming module according to various embodiments of the present disclosure may include at least one or more of the aforementioned constituent elements, or omit some of the aforementioned constituent elements, or further include additional other constituent elements. Operations carried out by the module, the programming module or other constituent elements according to various embodiments of the present disclosure may be executed in a sequential, parallel, repeated or heuristic method. Also, some operations may be executed in different order or may be omitted, or other operations may be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A method for measuring a temperature in an electronic device including an infrared (IR) sensor and a temperature sensor, the method comprising:
   emitting, by using the IR sensor, an IR light in response to receiving an input for measuring a temperature of an object;
   receiving, by using the IR sensor, a light reflected from the object, the light being a reflected light of the IR light;
   measuring an amount of the light reflected from the object;
   determining a distance between the object and the IR sensor, based on the measured amount of the light;
   determining a size of a region for measuring a temperature of the object based on the determined distance and a predetermined distance between the IR sensor and the temperature sensor;
   determining whether the determined size of the region is different from a preset size; and outputting a temperature measurement guide message, in response to determining that the determined size of the region is different from the preset size.

2. The method of claim 1, wherein the preset size is determined based on a capacity of the temperature sensor.

3. The method of claim 1, further comprising:
in response to determining that the determined size of the region is the same as the preset size, initiating a measurement of the temperature for the region by using the temperature sensor.

4. The method of claim 1, wherein outputting the temperature measurement guide message comprises:
in response to determining that the determined size of the region is larger than the preset size, outputting a message requiring a user of the electronic device to reduce the distance between the IR sensor and the object.

5. The method of claim 1, wherein outputting the temperature measurement guide message comprises:
in response to determining that the determined size of the region is smaller than the preset size, outputting a message requiring a user of the electronic device to increase the distance between the IR sensor and the region.

6. The method of claim 1, further comprising:
capturing an image representing the region by using a camera of the electronic device;
identifying whether another object exists on the region by analyzing the captured image, the other object being different from the object; and
in response to determining that the other object exists on the region, outputting a message for guiding a user of the electronic device to remove the other object on the region.

7. The method of claim 1, wherein outputting the temperature measurement guide message comprises:
outputting the temperature measurement guide message by generating, by using a motor of the electronic device, a vibration of which an intensity is varied based on a degree of difference between the determined size of the region and the preset size.

8. The method of claim 1, wherein determining the distance between the IR sensor and the object comprises:
identifying a distance corresponding to the measured amount of the light based on a table stored in a memory of the electronic device indicating a correlation between each of a plurality of distances and each of a plurality of amounts of the light; and
determining the identified distance as the distance between the IR sensor and the object.

9. The method of claim 1, further comprising:
capturing an image representing the region by using a camera of the electronic device;
identifying a color of the object based on the captured image; and
obtaining the distance between the object and the IR sensor based on the measure amount of the light and the identified color of the object.

10. The method of claim 1, wherein outputting the temperature measurement guide message further comprises:
outputting the temperature measurement guide message by transmitting the temperature measurement guide message to an external electronic device to which the electronic device is wirelessly connected.

11. An electronic device for measuring a temperature, the electronic device comprising:
a camera;
a memory;
an infrared (IR) sensor;
a temperature sensor; and
a processor configured to:
emit, by using the IR sensor, an IR light in response to receiving an input for measuring a temperature of an object;
receive, by using the IR sensor, a light reflected from the object, the light being a reflected light of the IR light;
measure an amount of the light reflected from the object;
determine a distance between the object and the IR sensor, based on the measured amount of the light;
determine a size of a region for measuring a temperature of the object based on the determined distance and a predetermined distance between the IR sensor and the temperature sensor;
determine whether the determined size of the region is different from a preset size; and
output a temperature measurement guide message, in response to determining that the determined size of the region is different from the preset size.

12. The electronic device of claim 11, wherein the preset size is determined based on a capacity of the temperature sensor.

13. The electronic device of claim 11, wherein the processor is configured to initiate a measurement of the temperature for the region by using the temperature sensor in response to determining that the determined size of the region is the same as the preset size.

14. The electronic device of claim 11, wherein the processor is configured to output a message requiring a user of the electronic device to reduce the distance between the IR sensor and the object, in response to determining that the determined size of the region is larger than the preset size.

15. The electronic device of claim 11, wherein the processor is configured to output a message requiring a user of the electronic device to increase the distance between the IR sensor and the object, in response to determining that the determined size of the region is smaller than the preset size.

16. The electronic device of claim 11, wherein the processor is configured to:
capture, by using the camera, an image representing the region; and
identify whether another object exists on the region by analyzing the captured image, the other object being different from the object; and
in response to determining that the other object exists on the region, output a message for guiding a user of the electronic device to remove the other object on the region.

17. The electronic device of claim 11, wherein the processor is configured to output the temperature measurement guide message by generating, by using a motor of the electronic device, a vibration of which an intensity is varied based on a degree of difference between the determined size of the region and the preset size.

18. The electronic device of claim 11, wherein the at least one processor is configured to:
identify a distance corresponding to the measured amount of the light based on a table stored in a memory of the electronic device indicating a correlation between each of a plurality of distances and each of a plurality of amounts of the light; and
determine the identified distance as the distance between the IR sensor and the object.

19. The electronic device of claim 11, wherein the at least one processor is configured to:
- identify a color of the object based on the captured image, and
- obtain the distance between the object and the IR sensor based on the measure amount of the light and the identified color of the object.

20. The electronic device of claim 11, wherein the at least one processor is configured to output the temperature measurement guide message by transmitting the temperature measurement guide message to an external electronic device to which the electronic device is wirelessly connected.

* * * * *